(12) United States Patent
Spengler et al.

(10) Patent No.: US 12,420,445 B2
(45) Date of Patent: Sep. 23, 2025

(54) CIRCULAR SAWS WITH PIVOT ASSEMBLIES AND PIVOT BIAS MECHANISMS

(71) Applicant: Festool GmbH, Wendlingen am Neckar (DE)

(72) Inventors: Wolfgang Spengler, Neidlingen (DE); Martin Werbach, Stuttgart (DE)

(73) Assignee: Festool GmbH, Wendlingen am Neckar (DE)

( * ) Notice: Subject to any disclaimer, the term of this patent is extended or adjusted under 35 U.S.C. 154(b) by 456 days.

(21) Appl. No.: 17/919,654

(22) PCT Filed: Jun. 23, 2021

(86) PCT No.: PCT/EP2021/067139
§ 371 (c)(1),
(2) Date: Oct. 18, 2022

(87) PCT Pub. No.: WO2021/260001
PCT Pub. Date: Dec. 30, 2021

(65) Prior Publication Data
US 2023/0158704 A1    May 25, 2023

Related U.S. Application Data

(60) Provisional application No. 63/044,034, filed on Jun. 25, 2020.

(51) Int. Cl.
*B27G 19/10*   (2006.01)
*B23D 45/16*   (2006.01)
(Continued)

(52) U.S. Cl.
CPC ............ *B27G 19/10* (2013.01); *B23D 45/16* (2013.01); *B23D 59/003* (2013.01); *B23Q 11/06* (2013.01);
(Continued)

(58) Field of Classification Search
CPC ...... B23D 47/02; B23D 47/12; B23D 59/003; B27B 9/02; B27B 5/32; B27B 5/30; B27B 9/04
(Continued)

(56) References Cited

U.S. PATENT DOCUMENTS 4,022,182 A    5/1977 Lenkevich
5,588,213 A   12/1996 Swanberg
(Continued)

FOREIGN PATENT DOCUMENTS

CN          1532498 A  *  9/2004   ........... E05D 7/1005
DE    202010013185 U1  *  5/2011   ............... B27B 9/02
(Continued)

OTHER PUBLICATIONS

CN-1532498-A, translation (Year: 2025).*
(Continued)

*Primary Examiner* — Nhat Chieu Q Do
(74) *Attorney, Agent, or Firm* — Lucian Wayne Beavers; Patterson Intellectual Property Law, PC

(57) ABSTRACT

Circular saws are disclosed herein. The circular saws include a cutting assembly, a base plate, a pivot assembly, and a pivot bias mechanism. The cutting assembly includes a motor and an arbor. The base plate defines an assembly-facing side and an assembly-opposed side. The pivot assembly operatively attaches the cutting assembly to the base plate. The cutting assembly and the base plate are configured to operatively rotate, relative to one another and about a pivot axis of the pivot assembly, to selectively vary a region of the circular saw blade that extends on the assembly-opposed side of the base plate. The pivot bias mechanism is configured to apply a linear force between the cutting assembly and the base plate in a linear bias direction that (Continued)

urges the cutting assembly and the base plate in opposed directions along the pivot axis.

19 Claims, 17 Drawing Sheets

(51) Int. Cl.
    *B23D 59/00*     (2006.01)
    *B23Q 11/06*     (2006.01)
    *B23Q 11/08*     (2006.01)
    *B25F 5/02*     (2006.01)
    *B27B 9/04*     (2006.01)
    *B27G 19/04*     (2006.01)
    *B23D 47/02*     (2006.01)
    *B27B 9/02*     (2006.01)

(52) U.S. Cl.
    CPC .............. *B23Q 11/08* (2013.01); *B25F 5/021* (2013.01); *B27B 9/04* (2013.01); *B27G 19/04* (2013.01); *B23D 47/02* (2013.01); *B27B 9/02* (2013.01)

(58) Field of Classification Search
    USPC ................................................ 83/13; 30/391
    See application file for complete search history.

(56) References Cited

U.S. PATENT DOCUMENTS

| | | |
|---|---|---|
| 2010/0325903 A1 | 12/2010 | Patel |
| 2011/0162218 A1 | 7/2011 | Roise et al. |
| 2014/0208600 A1 | 7/2014 | Moreno et al. |
| 2020/0254576 A1* | 8/2020 | Kume .................... B23D 45/04 |

FOREIGN PATENT DOCUMENTS

| | | | |
|---|---|---|---|
| EP | 297469 A2 | 6/1988 | |
| EP | 2762282 A1 * | 8/2014 | .............. B27B 9/02 |
| EP | 2812144 A1 | 12/2014 | |
| EP | 3385044 A1 | 10/2018 | |
| JP | 64087112 A | 3/1989 | |
| JP | 2014028490 A | 2/2014 | |
| JP | 2017024116 A | 2/2017 | |
| JP | 2018176462 A | 11/2018 | |
| WO | 9301922 A1 | 2/1993 | |
| WO | 2013117159 A1 | 8/2013 | |

OTHER PUBLICATIONS

Translation, DE-202010013185-U1 (Year: 2025).*
International Search Report and Written Report for corresponding patent application No. PCT/EP2021/067139, dated Oct. 6, 2021, 12 pages (not prior art).
Japan Office Action for corresponding patent application No. 2022-577498, dated January 30, 2024, 8 pages (not prior art).

* cited by examiner

CIRCULAR SAWS WITH PIVOT ASSEMBLIES AND PIVOT BIAS MECHANISMS

RELATED APPLICATION

This application claims priority to U.S. Provisional Patent Application No. 63/044,034, which was filed on Jun. 25, 2020, and the complete disclosure of which is hereby incorporated by reference.

FIELD OF THE DISCLOSURE

The present disclosure is directed generally to circular saws with pivot assemblies and pivot bias mechanisms.

BACKGROUND OF THE DISCLOSURE

Circular saws utilize a rotating circular saw blade to cut a workpiece. Some circular saws include a pivot assembly, which may pivotally interconnect the circular saw blade and a base plate of the circular saws. Such circular saws may be configured to change and/or vary a depth-of-cut of the circular saws within the workpiece and/or to plunge the rotating circular saw blade into the workpiece via rotation of the circular saw blade and the base plate relative to one another and about a pivot axis of the pivot assembly. Pivot assemblies generally include bearings and/or bushings that permit some movement of the circular saw blade and the base plate relative to one another and in one or more directions other than about the pivot axis. Stated another way, pivot assemblies may be designed to provide only rotational relative motion between the circular saw blade and the base plate about the pivot axis. However, manufacturing tolerances within the pivot assemblies and/or wear of the pivot assemblies may cause motion in the one or more directions other than about the pivot axis also to be present. These other motions may decrease the accuracy and/or the precision of cuts that may be made utilizing the circular saws. Thus, there exists a need for improved circular saws with pivot assemblies and pivot bias mechanisms that may be utilized to decrease, or to eliminate, a magnitude of these other motions.

SUMMARY OF THE DISCLOSURE

Circular saws are disclosed herein. The circular saws include a cutting assembly, a base plate, a pivot assembly, and a pivot bias mechanism. The cutting assembly includes a motor, which includes a motor shaft configured to rotate about a shaft rotational axis, and an arbor, which is configured to operatively attach a circular saw blade to the circular saw and to rotate the circular saw blade about an arbor rotational axis when the arbor receives a torque from the motor via rotation of the motor shaft about the shaft rotational axis. The base plate defines an assembly-facing side and an assembly-opposed side. The pivot assembly operatively attaches the cutting assembly to the base plate such that the assembly-facing side of the base plate faces toward the cutting assembly. The cutting assembly and the base plate are configured to operatively rotate, relative to one another and about a pivot axis of the pivot assembly, to selectively vary a region of the circular saw blade that extends on the assembly-opposed side of the base plate. The pivot bias mechanism is configured to apply a linear force between the cutting assembly and the base plate in a linear bias direction that urges the cutting assembly and the base plate in opposed directions along the pivot axis.

DETAILED DESCRIPTION AND BEST MODE OF THE DISCLOSURE

Figure 1:
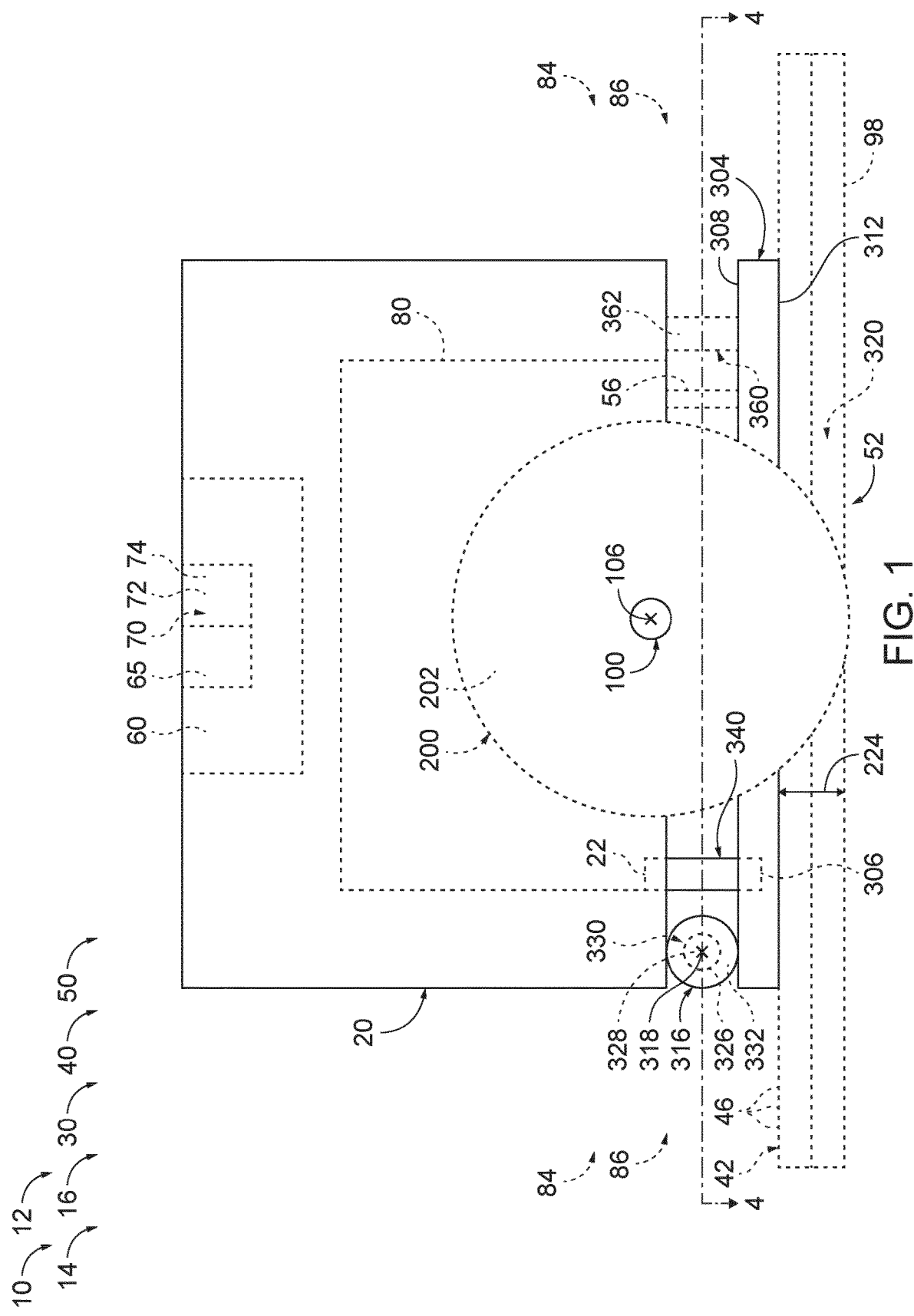
FIG. 1 is a schematic side view illustrating examples of circular saws, according to the present disclosure, in a plunged orientation.

FIGS. 1-17 provide examples of circular saws 10 and/or components thereof, according to the present disclosure. Elements that serve a similar, or at least substantially similar, purpose are labeled with like numbers in each of FIGS. 1-17, and these elements may not be discussed in detail herein with reference to each of FIGS. 1-17. Similarly, all elements may not be labeled in each of FIGS. 1-17, but reference numerals associated therewith may be utilized herein for consistency. Elements, components, and/or features that are discussed herein with reference to one or more of FIGS. 1-17 may be included in and/or utilized with any of FIGS. 1-17 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 2:
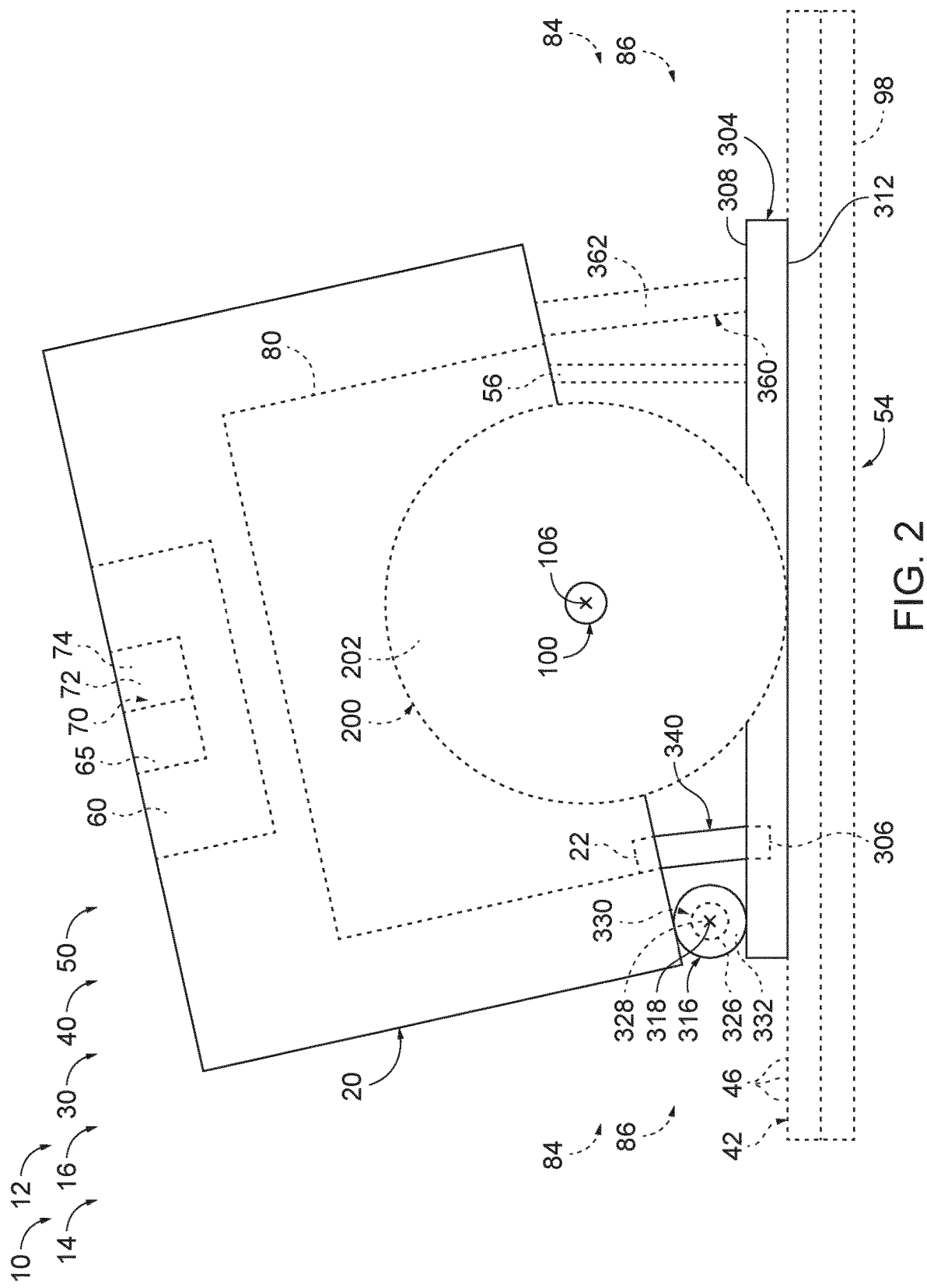
FIG. 2 is a schematic side view illustrating examples of circular saws, according to the present disclosure, in a retracted orientation.
Figure 3:
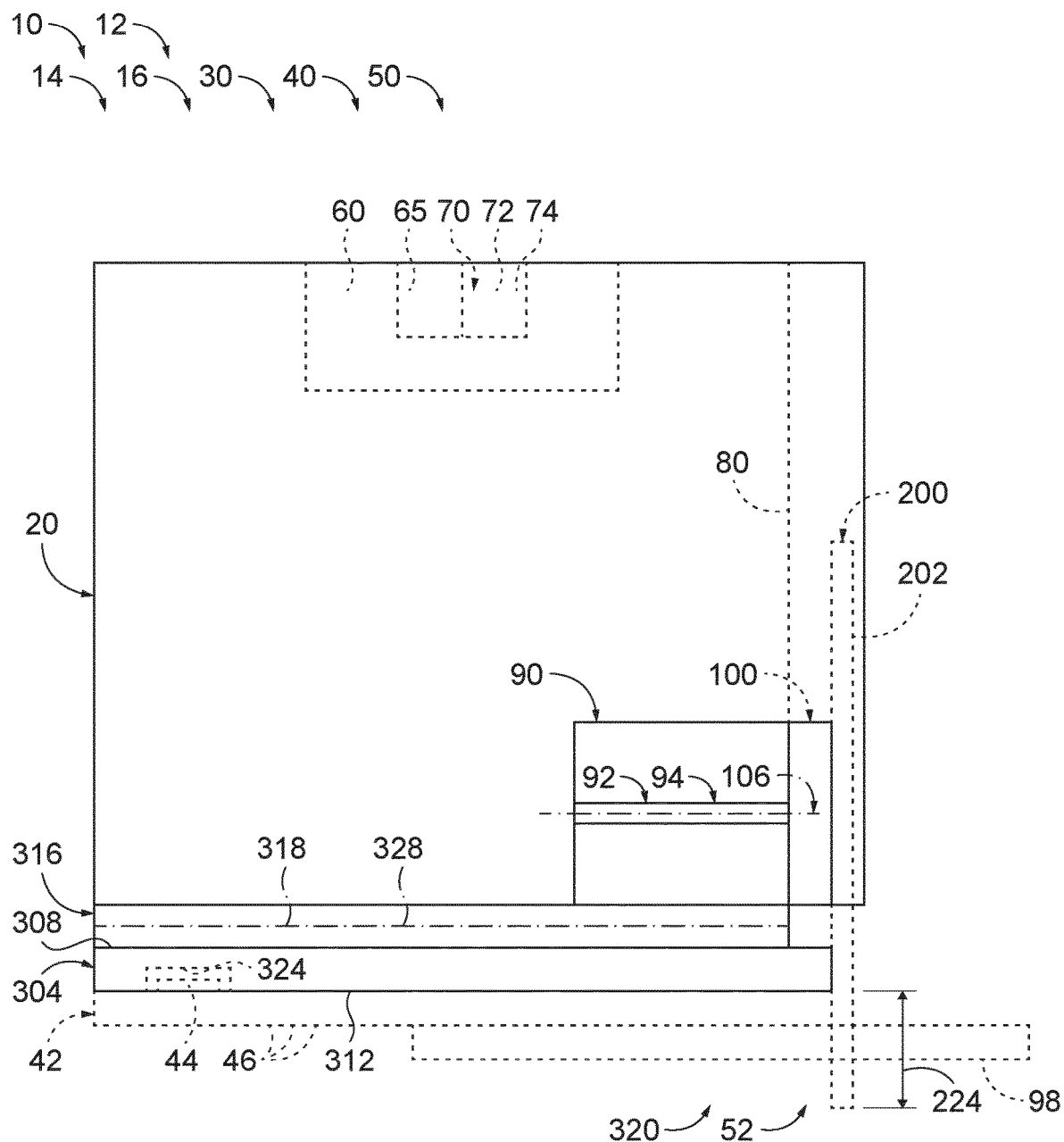
FIG. 3 is another schematic side view illustrating examples of circular saws according to the present disclosure.
Figure 4:
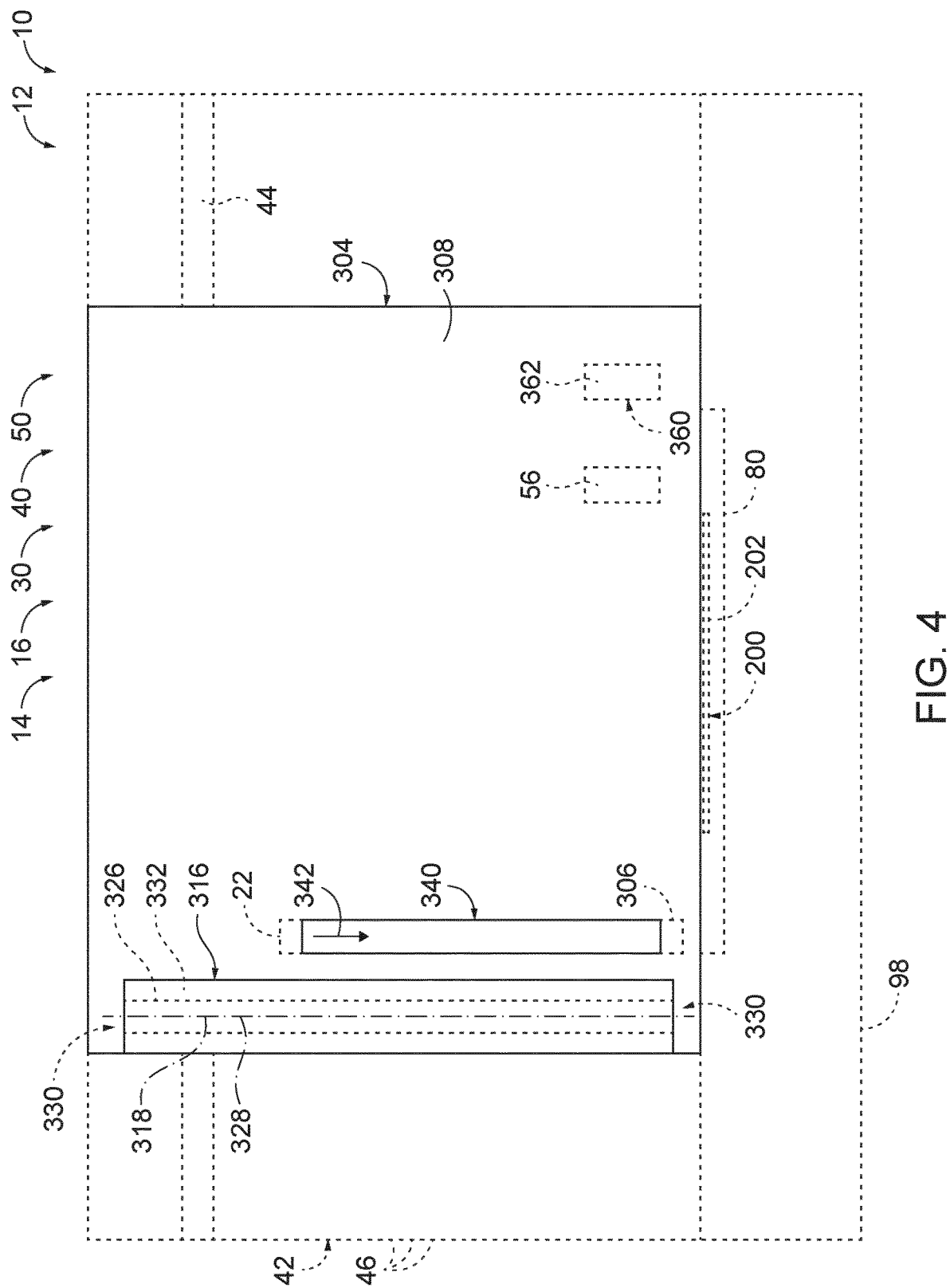
FIG. 4 is a schematic cross-sectional view of the circular saws of FIG. 1 taken along line 4-4 of FIG. 1.
Figure 5:
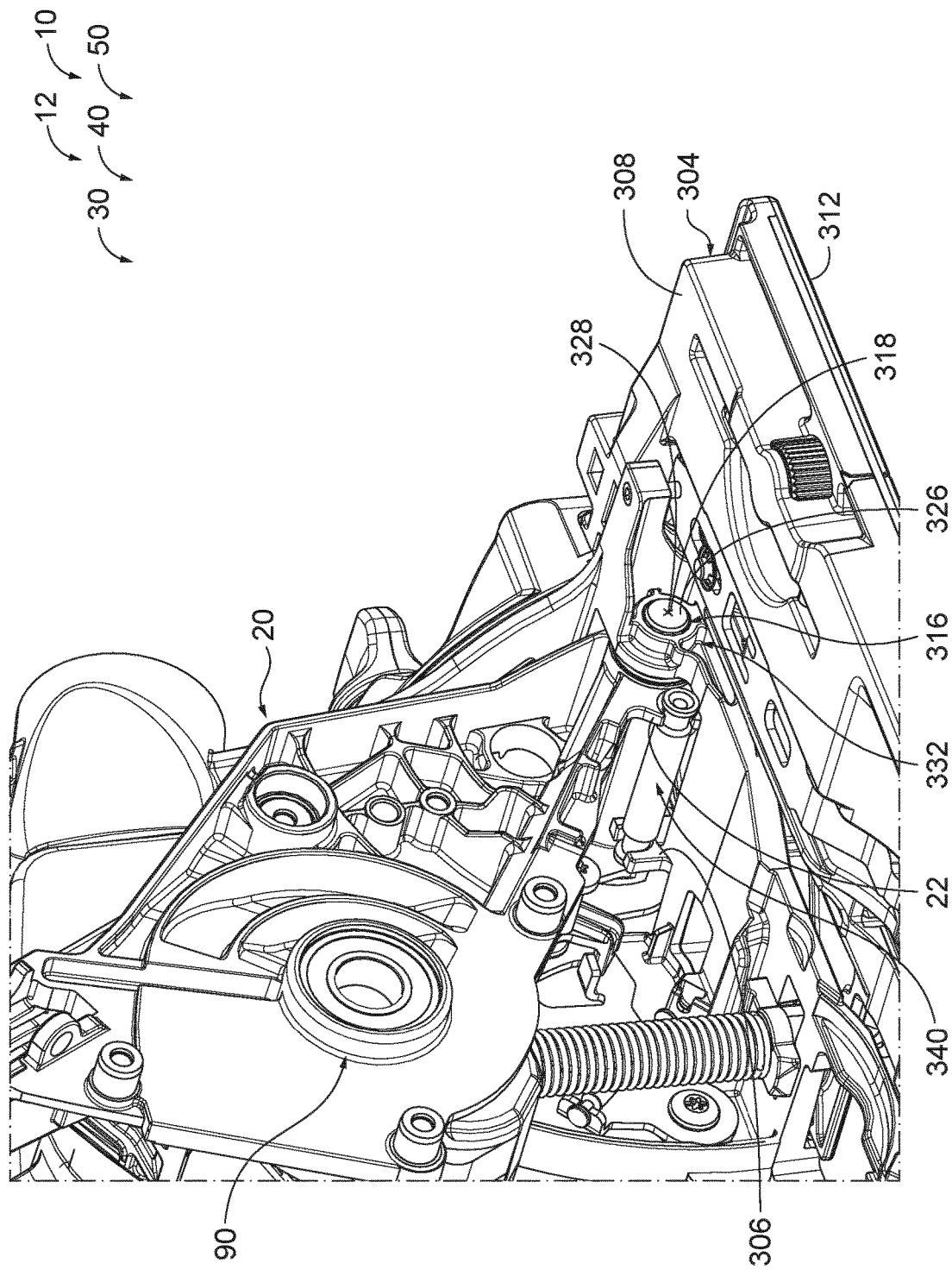
FIG. 5 is a less schematic profile view illustrating a region of a circular saw with a pivot bias mechanism according to the present disclosure.
Figure 6:
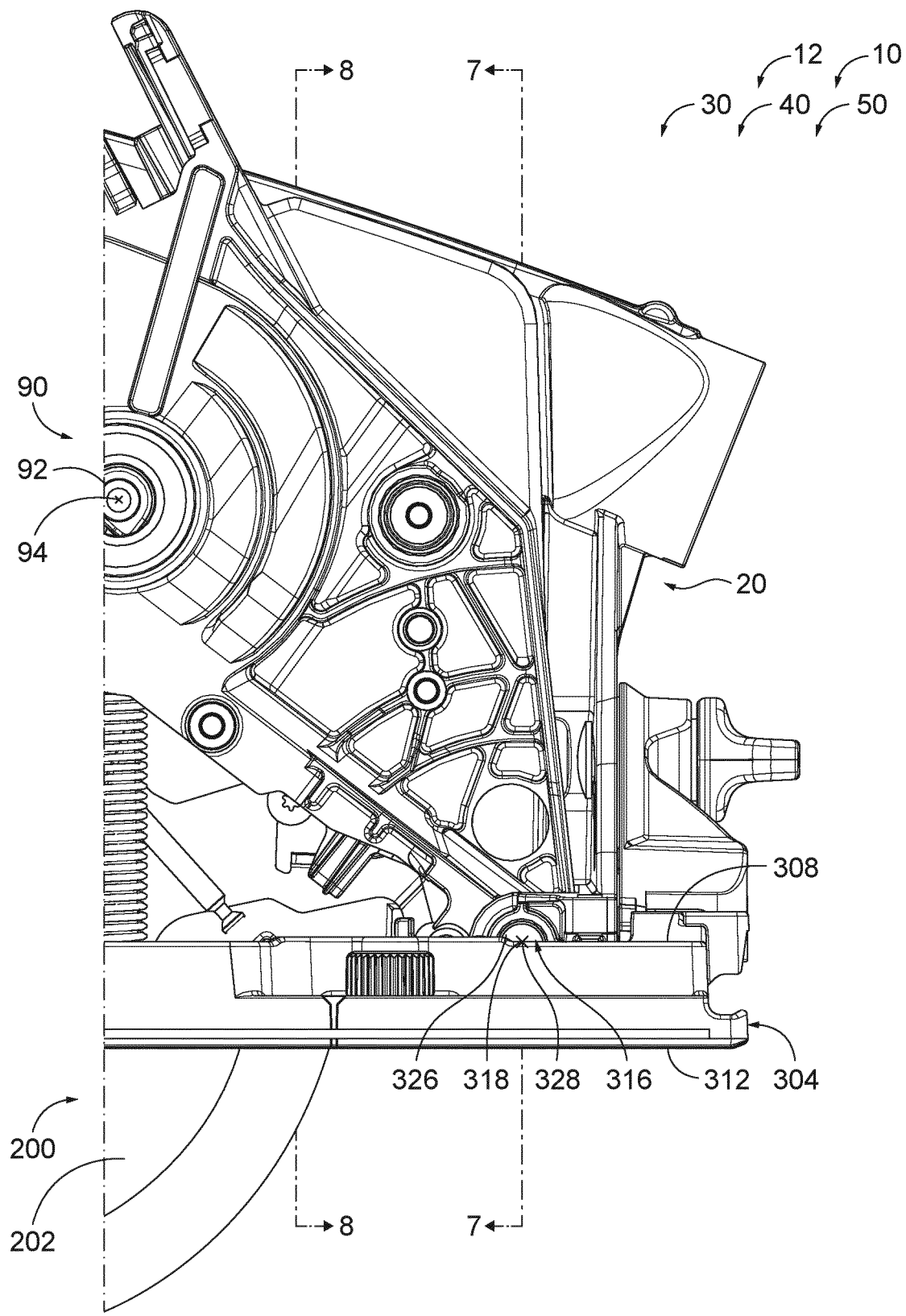
FIG. 6 is a less schematic side view illustrating the region of the circular saw of FIG. 5.
Figure 7:
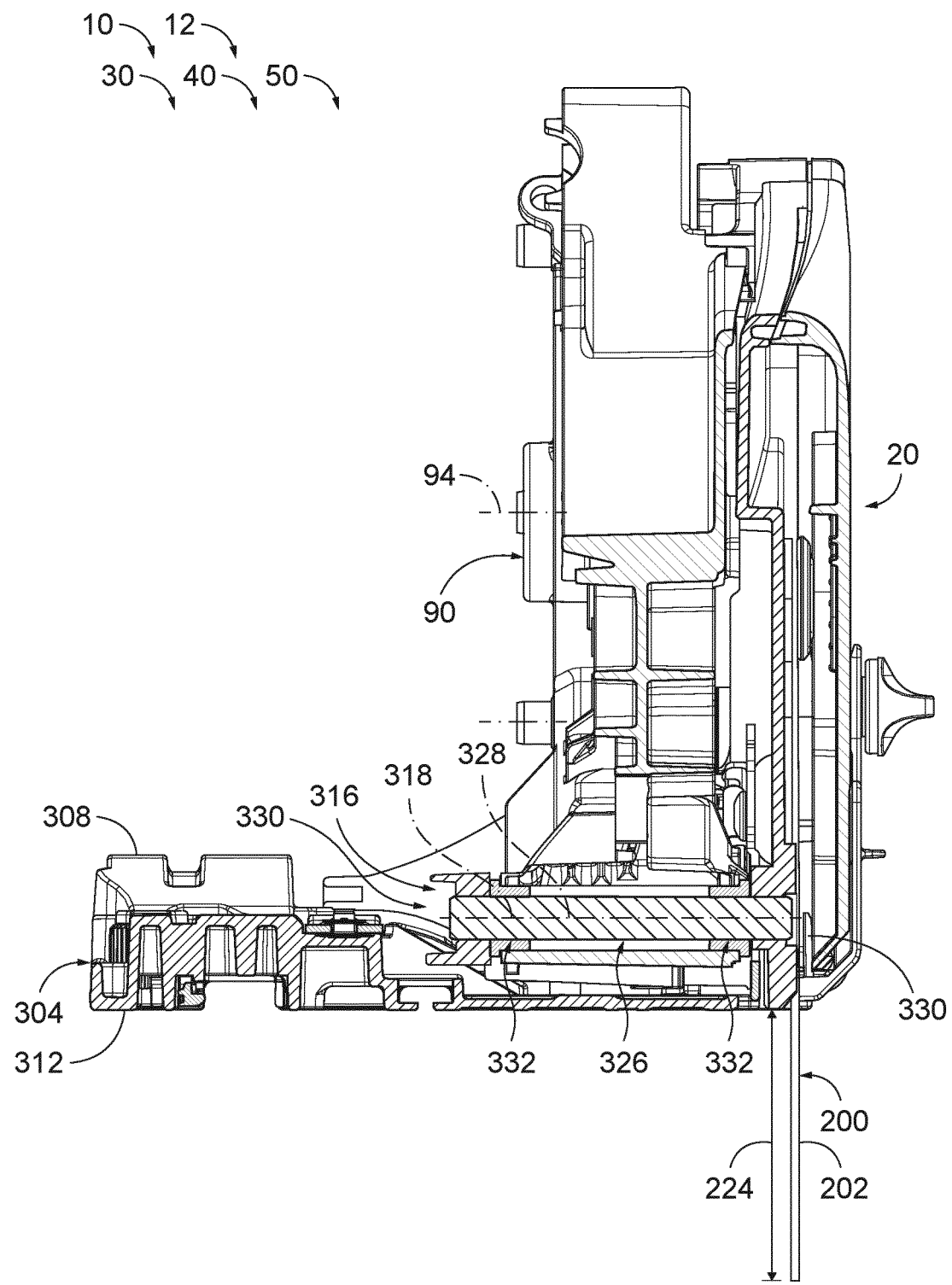
FIG. 7 is a less schematic cross-sectional view of the circular saw of FIGS. 5-6 taken along lines 7-7 of FIG. 6.
Figure 8:
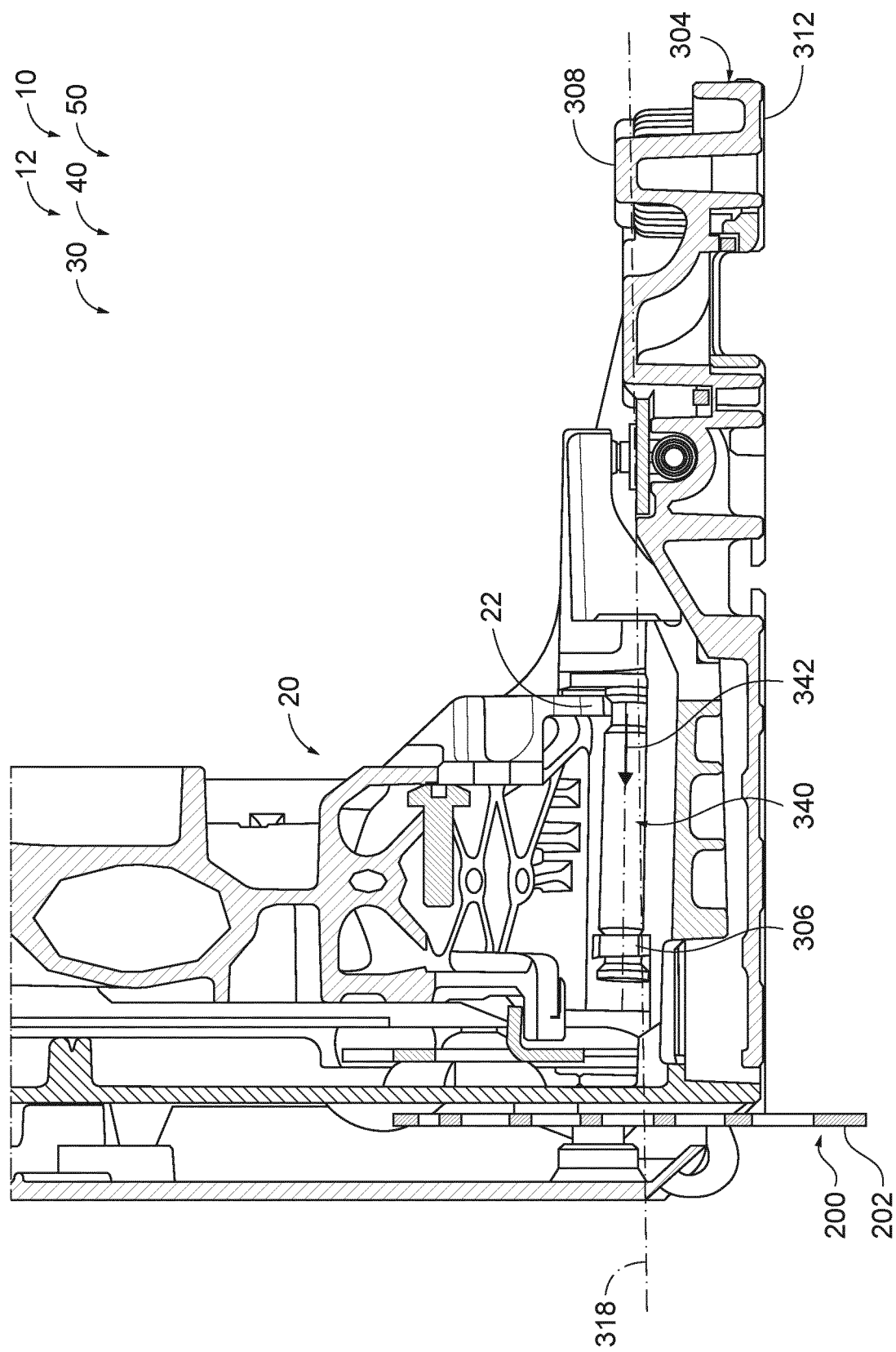
FIG. 8 is a less schematic cross-sectional view of the circular saw of FIGS. 5-7 taken along lines 8-8 of FIG. 6.
Figure 9:
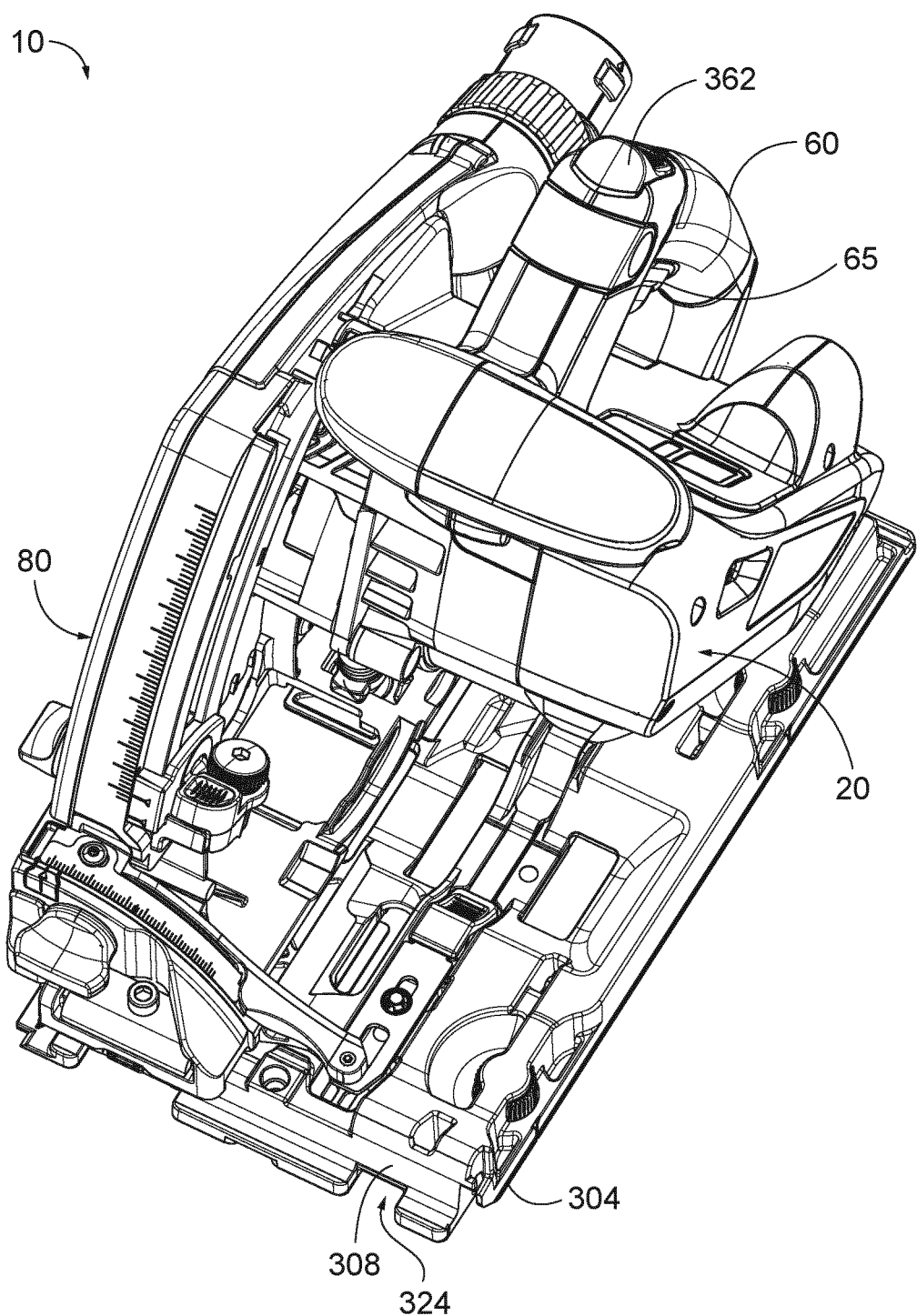
FIG. 9 is a less schematic top profile view of an example of a circular saw according to the present disclosure.
Figure 10:
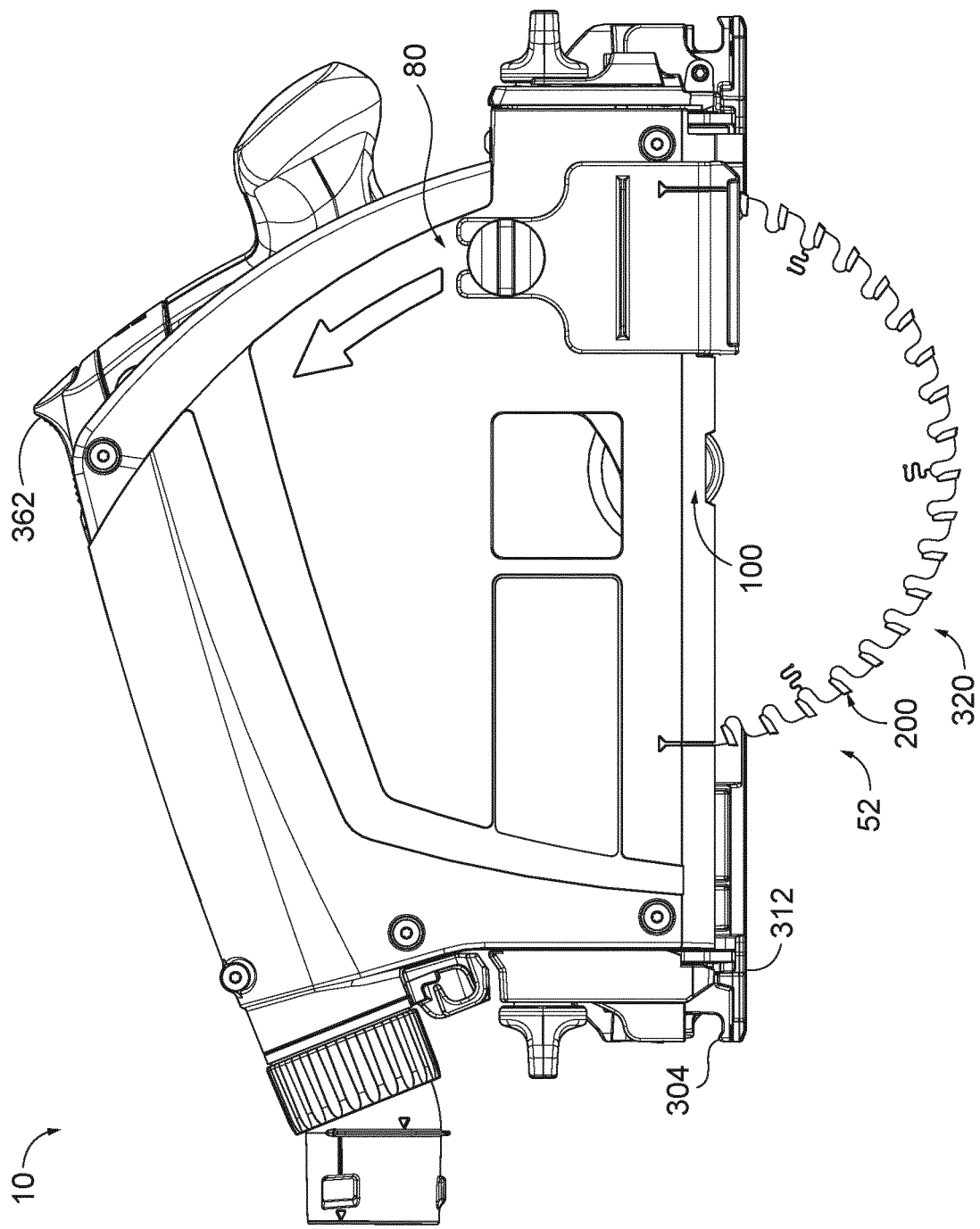
FIG. 10 is a less schematic right side view of an example of a circular saw according to the present disclosure.
Figure 11:
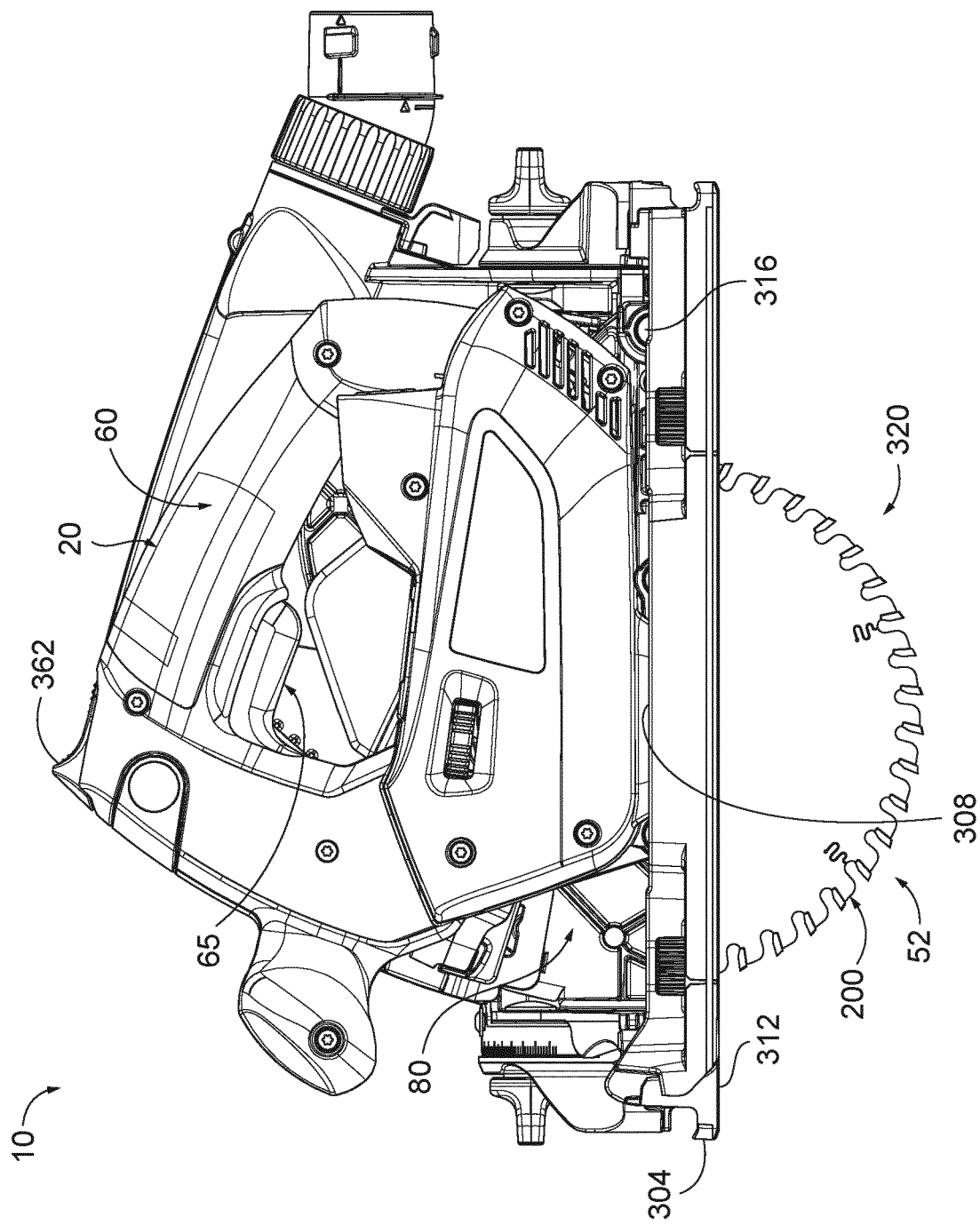
FIG. 11 is a less schematic left side view of an example of a circular saw according to the present disclosure.
Figure 12:
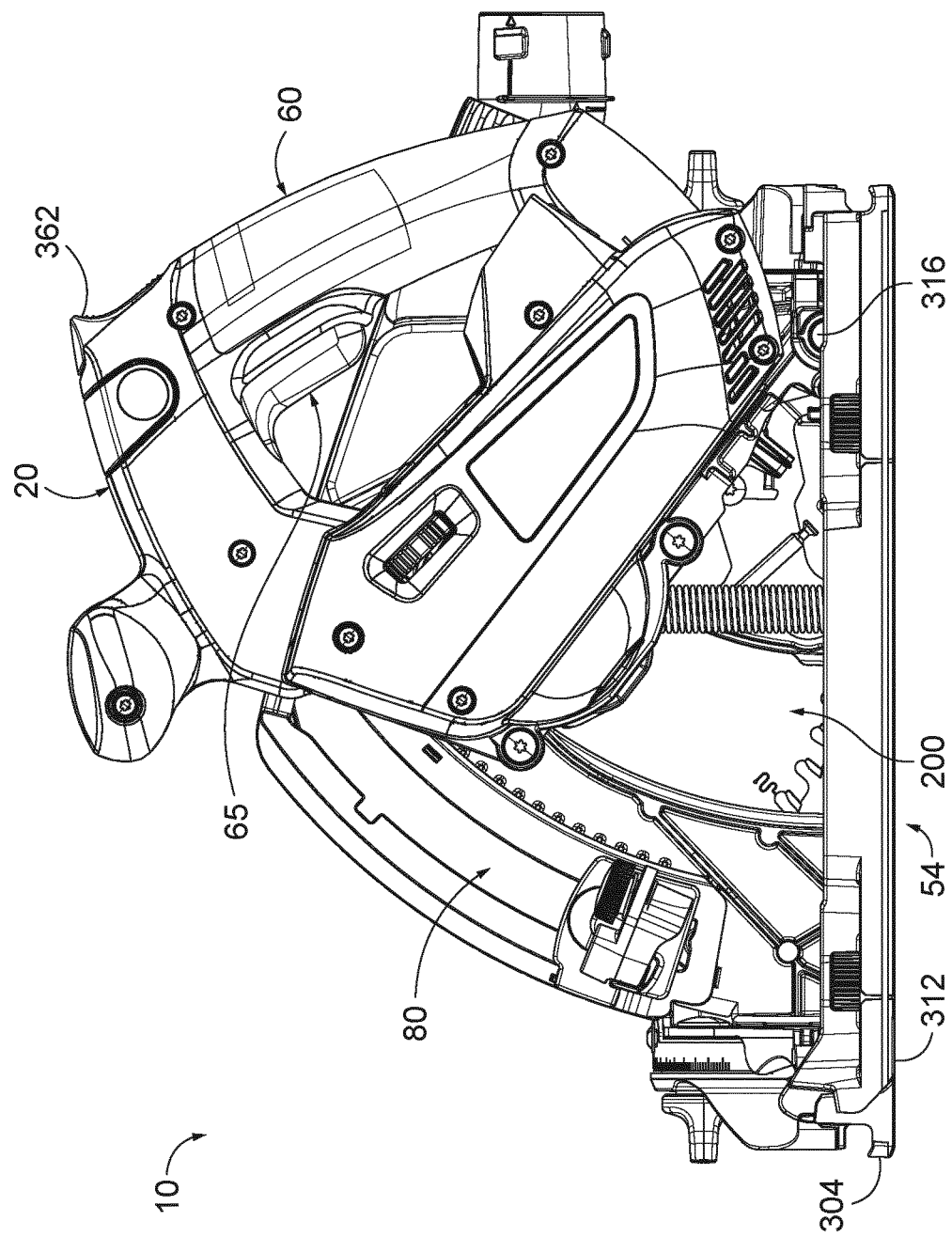
FIG. 12 is another less schematic left side view of an example of a circular saw according to the present disclosure.
Figure 13:
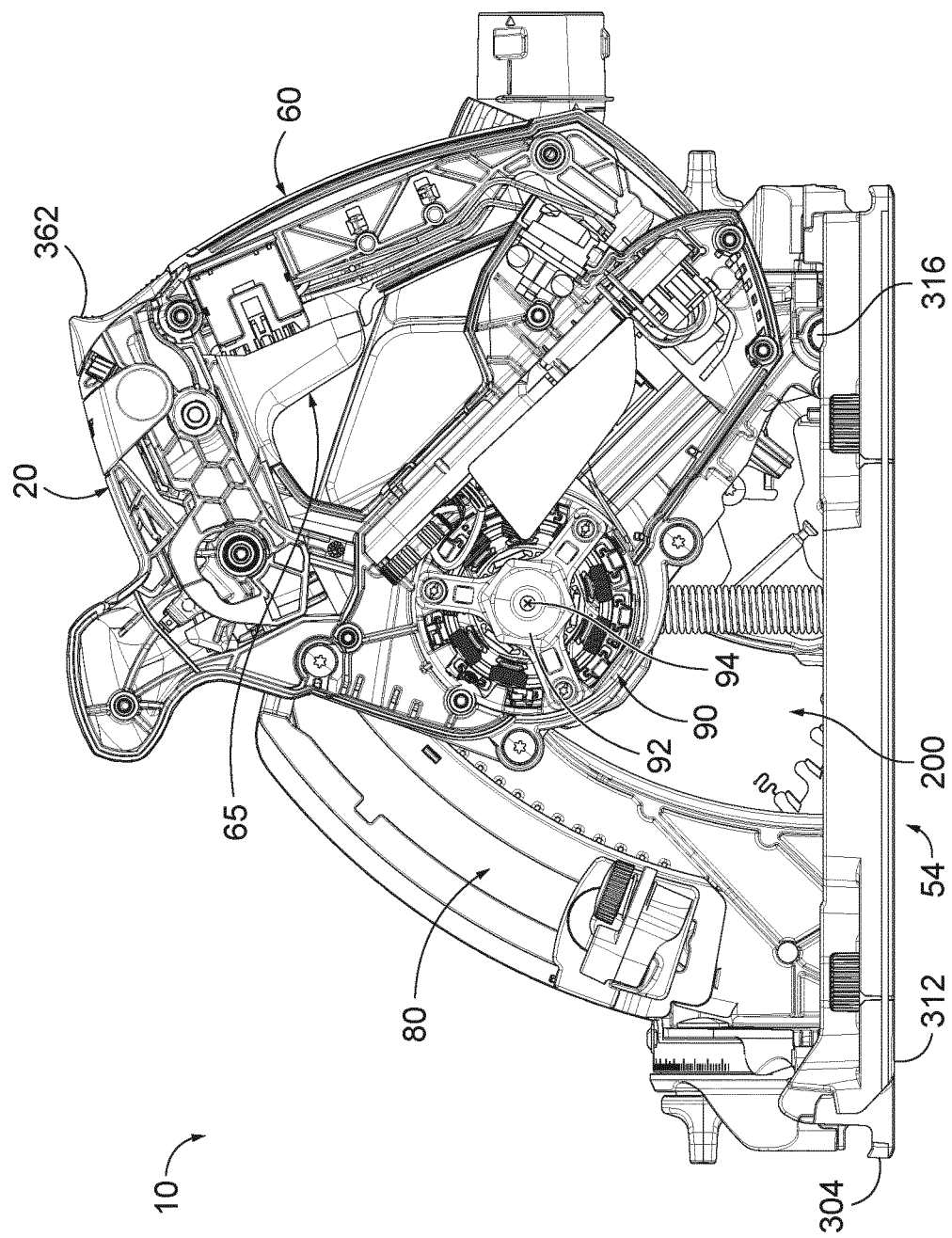
FIG. 13 is another less schematic left side view of an example of a circular saw according to the present disclosure.
Figure 14:
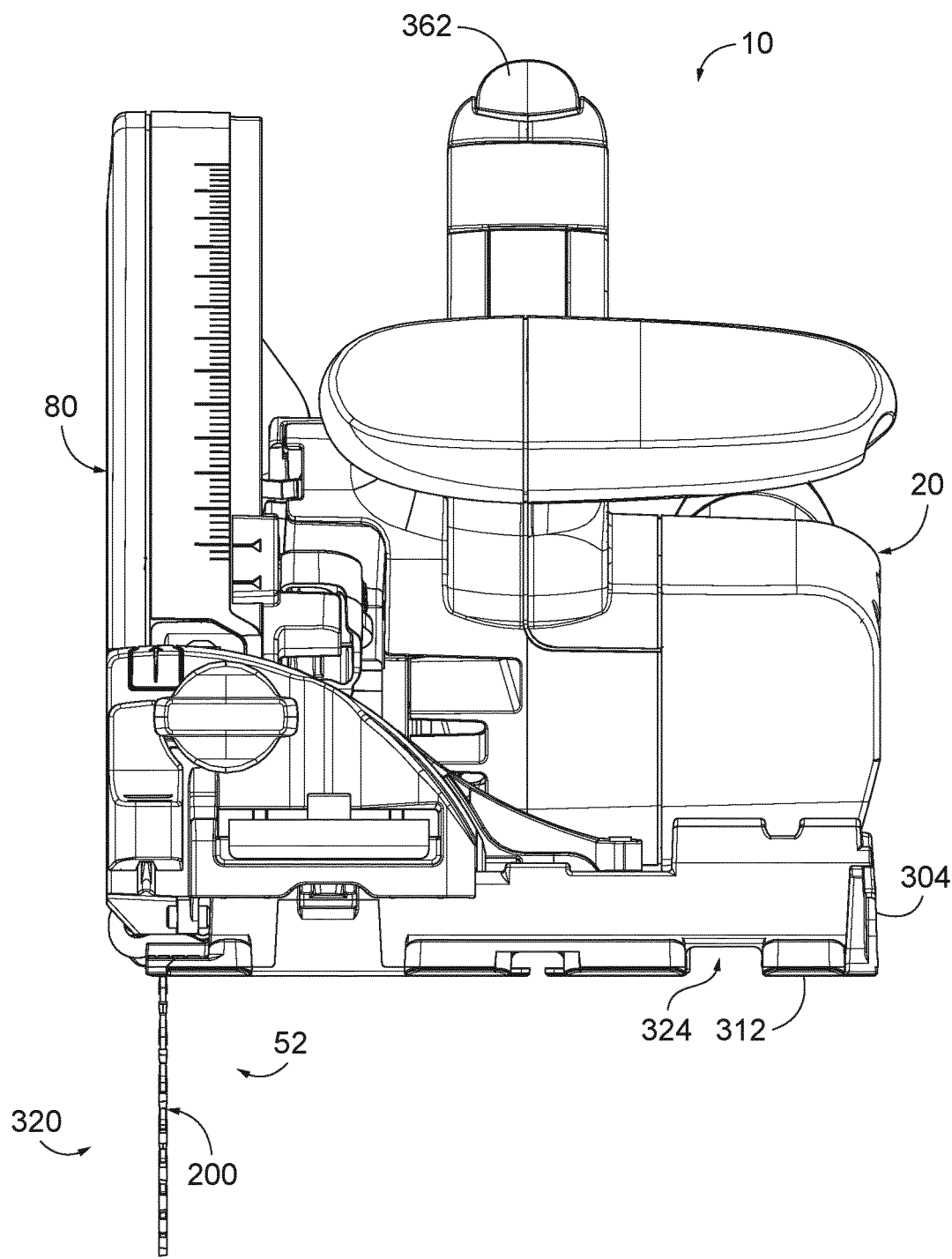
FIG. 14 is a less schematic front view of an example of a circular saw according to the present disclosure.
Figure 15:
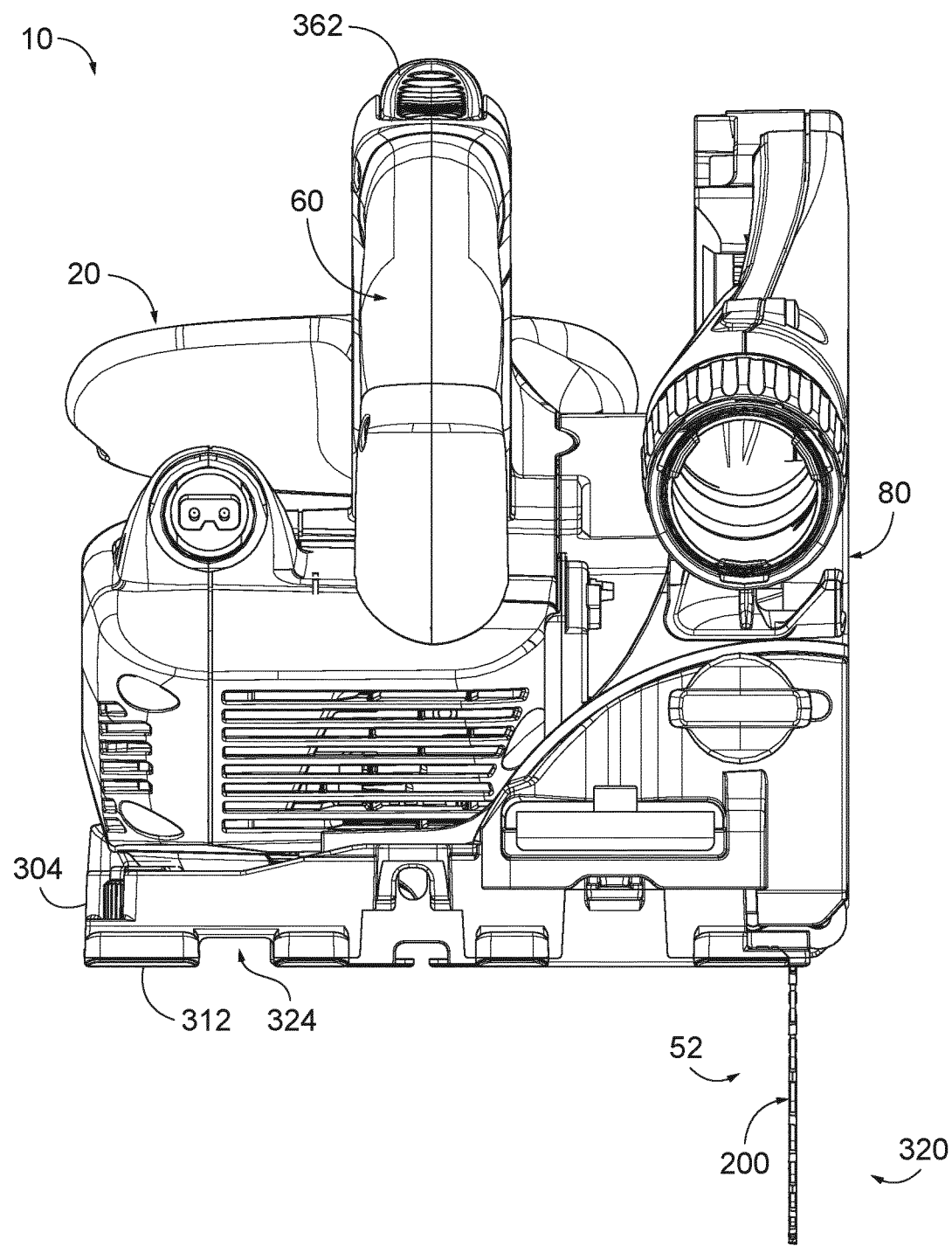
FIG. 15 is a less schematic rear view of an example of a circular saw according to the present disclosure.
Figure 16:
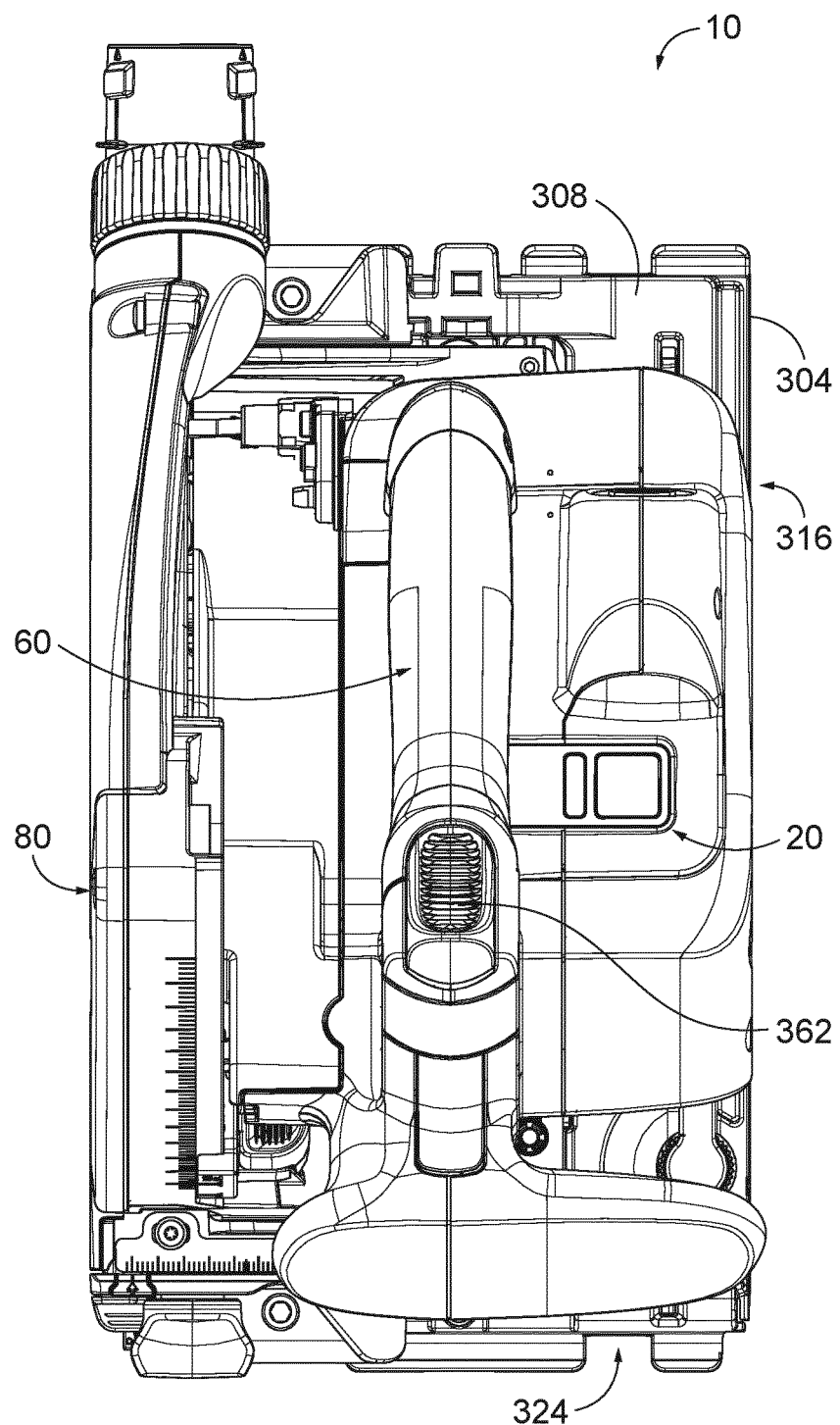
FIG. 16 is a less schematic top view of an example of a circular saw according to the present disclosure.
Figure 17:
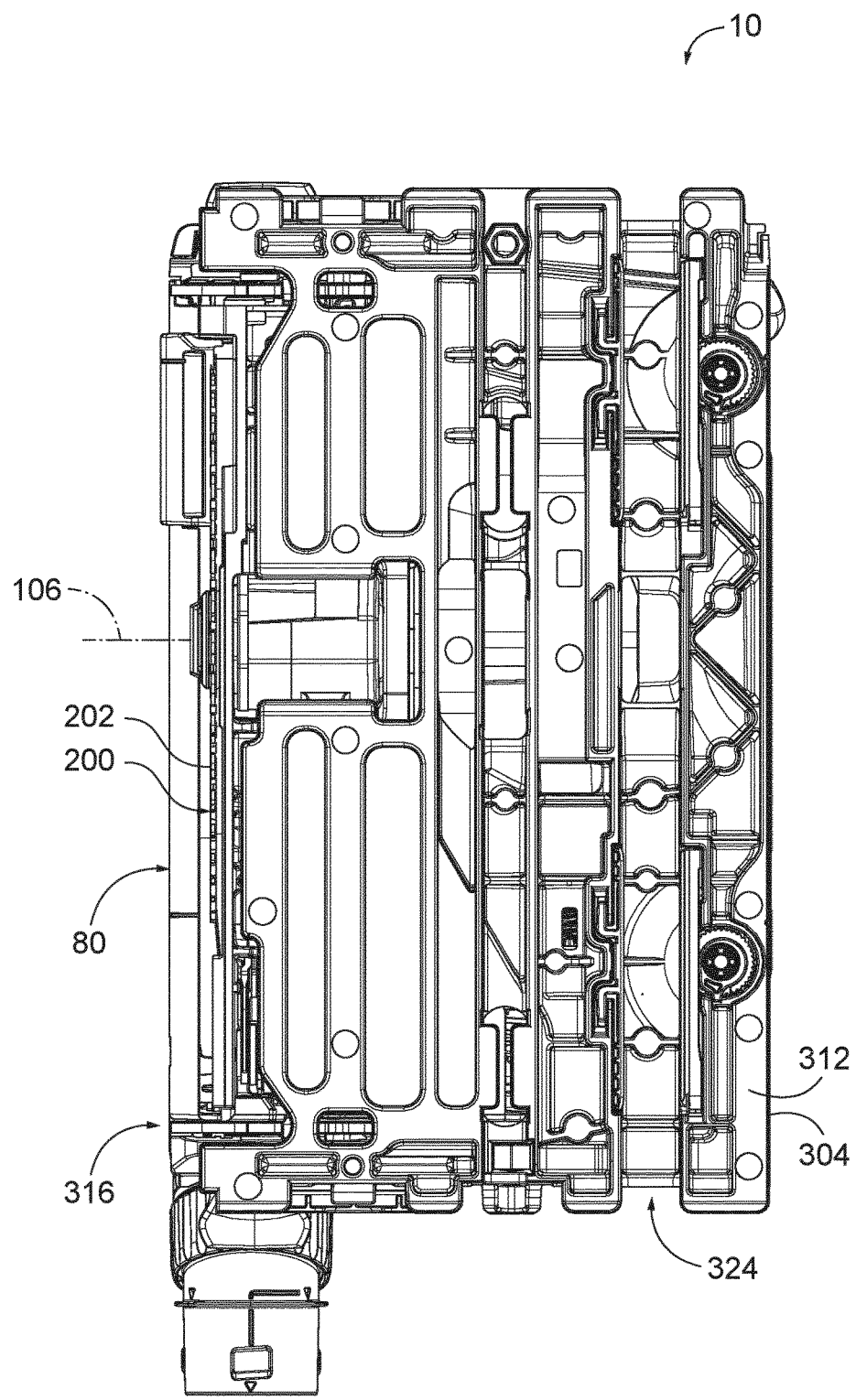
FIG. 17 is a less schematic bottom view of an example of a circular saw according to the present disclosure.

FIGS. 1-4 are schematic illustrations of examples of circular saws 10 according to the present disclosure, while FIGS. 5-8 are less schematic illustrations of an example of a circular saw 10 according to the present disclosure, and FIGS. 9-17 provide additional less schematic illustrations of an example of a circular saw 10 according to the present disclosure. More specifically, FIG. 1 is a schematic side view illustrating examples of circular saws 10 in a plunged orientation 52, FIG. 2 is a schematic side view illustrating examples of circular saws 10 in a retracted orientation 54, FIG. 3 is another schematic side view illustrating examples of circular saws 10, and FIG. 4 is a schematic cross-sectional view of circular saws 10 of FIG. 1 taken along line 4-4 of FIG. 1. FIG. 5 is a less schematic profile view illustrating a region of a circular saw 10 with a pivot bias mechanism according to the present disclosure, FIG. 6 is a less schematic side view illustrating the region of circular saw 10 of FIG. 5, FIG. 7 is a less schematic cross-sectional view of circular saw 10 of FIGS. 5-6 taken along lines 7-7 of FIG. 6, FIG. 8 is a less schematic cross-sectional view of circular saw 10 of FIGS. 5-7 taken along lines 8-8 of FIG. 6. FIG. 9 illustrates a top profile view of circular saw 10, and FIG. 10 illustrates a right side view of circular saw 10. FIG. 11 illustrates a left side view of circular saw 10 illustrating the circular saw in plunged orientation 52, FIG. 12 illustrates the left side view of circular saw 10 illustrating the circular saw in a fully retracted orientation 54, and FIG. 13 illustrates the left side view of FIG. 12 with several covers removed. FIG. 14 is a front view of circular saw 10, FIG. 15 is a rear view of circular saw 10, FIG. 16 is a top view of circular saw 10, and FIG. 17 is a bottom view of circular saw 10.

As illustrated collectively by FIGS. 1-17, circular saws 10 include a cutting assembly 20, a base plate 304, a pivot assembly 316, and a pivot bias mechanism 340. Cutting assembly 20 includes a motor 90 that includes a motor shaft 92 configured to rotate about a shaft axis of rotation 94. Cutting assembly 20 also includes an arbor 100, which is configured to operatively attach a circular saw blade 200 to circular saw 10 and/or to rotate the circular saw blade about an arbor rotational axis 106 and/or within a blade rotation plane 202 when the arbor receives a torque from the motor via rotation of the motor shaft. Base plate 304 defines an assembly-facing side 308 and an assembly-opposed side 312, and pivot assembly 316 operatively attaches cutting assembly 20 to base plate 304 such that assembly-facing side 308 faces toward the cutting assembly. Pivot assembly 316 is configured such that cutting assembly 20 and base plate 304 may operatively rotate relative to one another and/or about a pivot axis 318 of pivot assembly 316. This operative rotation may selectively vary a region 320 of circular saw blade 200 that extends on assembly-opposed side 312 of base plate 304. Pivot bias mechanism 340 may be configured to apply a linear bias force 342, which is illustrated in FIG. 4, between cutting assembly 20 and base plate 304. The linear bias force extends and/or is applied in a linear bias direction, as indicated by the arrow in FIG. 4 and/or along a linear bias axis, which extends along the arrow of FIG. 4, and urges cutting assembly 20 and base plate 304 in opposite, or opposed, directions along pivot axis 318.

During operation of circular saws 10, such as during operative use of the circular saws to cut a workpiece 98, which is illustrated schematically in FIGS. 1-4, cutting assembly 20 and base plate 304 may be rotated, relative to one another and about pivot axis 318 of pivot assembly 316, to change and/or vary a depth-of-cut 224 of the circular saw, to plunge circular saw blade 200 into workpiece 98, and/or to vary an extent to which the circular saw blade extends past assembly-opposed side 312 of base plate 304. Pivot assembly 316 may permit and/or facilitate this relative rotation.

However, and as discussed, manufacturing tolerances for pivot assembly 316 and/or wear within pivot assembly 316, such as may be caused by repeated utilization of the circular saw to cut the workpiece, may cause the pivot assembly to permit limited relative motion between cutting assembly 20 and base plate 304 other than rotational motion about pivot axis 318, such as axial motion along pivot axis 318. This limited relative motion may be undesirable and/or may decrease an accuracy and/or a precision of cuts produced by circular saws 10. However, linear bias force 342, exhibited by pivot bias mechanism 340, may oppose and/or decrease a magnitude of this limited relative motion, thereby improving the accuracy and/or precision of circular saws 10, according to the present disclosure, when compared to conventional circular saws that do not include and/or utilize pivot bias mechanism 340, according to the present disclosure.

Circular saws 10 may include any suitable type or style of circular saw that is adapted, configured, designed, and/or constructed to utilize a circular saw blade 200 to cut the workpiece. Examples of circular saws 10 include a handheld circular saw 12, a miter saw 14, a chop saw 16, a plunge saw 30, a track saw 40, and/or a bevel saw 50, as schematically illustrated in FIGS. 1-4. In some examples, circular saws 10 may include structures and/or features from two or more of the above saws, and/or may incorporate functionality of two or more of the above saws. As an example, and as discussed in more detail herein, a given circular saw 10 may be, and/or may incorporate functionality of, handheld circular saw 12, plunge saw 30, track saw 40, and/or bevel saw 50. Circular saws 10 according to the present disclosure thus may include one or more of the features disclosed herein, but circular saws 10 are not required to include all of the features disclosed herein.

Motor 90 may include any suitable structure that may provide the motive force for rotation of motor shaft 92 and/or for actuation of circular saw blade 200. Examples of motor 90 include an electric motor, an AC electric motor, a DC electric motor, a brushless DC motor, a variable-speed motor, and/or a single-speed motor.

As illustrated in dashed lines in FIGS. 1-3 and in solid lines in FIGS. 9, 11-13, and 15-16, circular saws 10 may include a gripping region 60 that is configured to be gripped and/or held by a user during operation of the circular saw. Gripping region 60, when present, also may be referred to herein as and/or may be a handle, or hand grip.

As also illustrated in dashed lines in FIGS. 1-3 and in solid lines in FIGS. 9 and 11-13, circular saws 10 may include at least one switch 65. Switch(es) 65, when present, may be configured to be selectively actuated by the user of the circular saw, such as to enable and/or permit electric current to be provided to at least one other component of the circular saw and/or to permit powered operation of the at least one other component of the circular saw. With this in mind, switch(es) 65 may be positioned and/or oriented to be actuated, by the user, while the user grips gripping region 60.

As examples, selective actuation of switch(es) 65 may be utilized to enable operation of a motor controller of the circular saw, to selectively apply an electric current to motor 90, to enable the motor controller to selectively apply the electric current to the motor, and/or to permit, or direct, the motor to provide the motive force for rotation of the motor shaft. In some examples, the electric current may be utilized to power, or to directly power, at least one other component of the circular saw, such as motor 90. In some such examples, the electric current also may be referred to herein as an electric power signal. In some examples, the electric current may be an electric data signal that is sent to at least one other component of the circular saw, such as the motor controller of the circular saw. In some such examples, the electric current also may be referred to herein as a data signal and/or as an electric data signal. Examples of switch 65 include an electrical switch, a normally open electrical switch, a momentary electrical switch, and/or a locking momentary electrical switch.

As also illustrated in in FIGS. 1-17, and as discussed, circular saws 10 include base plate 304, which defines assembly-facing side 308 and assembly-opposed side 312. Assembly-facing side 308 also may be referred to herein as and/or may be an arbor-facing side 308 of base plate 304. Similarly, assembly-opposed side 312 also may be referred to herein as and/or may be an arbor-opposed side 312 of base plate 304. Base plate 304 may be configured to support workpiece 98 and/or to position the circular saw relative to the workpiece when the workpiece is cut or otherwise acted upon by the circular saw blade. As also discussed, base plate 304 and cutting assembly 20 are configured to rotate, relative to one another, about pivot assembly 316, such as to selectively vary a region 320 of circular saw blade 200 that extends on assembly-opposed side 312 of the base plate, as perhaps best illustrated by the transition from the configuration that is illustrated in FIGS. 1 and 10-11, which illustrate plunged orientation 52, to the configuration that is illustrated in FIGS. 2 and 12-13, which illustrate retracted orientation 54.

Stated another way, cutting assembly 20 may be configured to pivot relative to base plate 304 throughout a range of relative orientations, or relative angles, that may be bounded by the plunged orientation and the retracted orientation. For each relative orientation in this range of relative orientations, circular saw blade 200 may extend on assembly-opposed side 312 by a corresponding amount, thereby providing a corresponding depth-of-cut 224 for the circular saw, as illustrated in FIG. 1.

Base plate 304 may include and/or be any suitable structure that is operatively attached to cutting assembly 20 via pivot assembly 316, that is configured to locate, position, and/or support the circular saw relative to the workpiece, and/or that is configured to rotate, relative to the cutting assembly, about pivot axis 318. In some examples, base plate 304 may include and/or be a monolithic, or a unitary, base plate 304. In some examples, base plate 304 may include a plurality of distinct and/or separate base plate components, which may be operatively attached to one another to form and/or define the base plate.

Circular saws 10 may include any suitable power source, and corresponding power structures, for powering motor 90. Examples of the power structures include a power supply structure 70, such as a power cord 72 and/or a battery 74, as illustrated in FIGS. 1-3.

As also illustrated in dashed lines in FIGS. 1-4 and in solid lines in FIGS. 9-17, circular saws 10 may include a blade guard 80. Blade guard 80, when present, may be configured to cover, to house, and/or to contain at least a region of circular saw blade 200, such as to prevent, or to decrease a potential for, contact between the user and the circular saw blade. In some examples of circular saws 10, blade guard 80 may include and/or define a retractable region. The retractable region may be configured to fold, rotate, and/or otherwise retract when the circular saw is utilized to cut the workpiece. The retractable region additionally or alternatively may be referred to as a retracting region and/or a collapsing region.

As illustrated in dashed lines in FIGS. 1-2, circular saws 10 may include and/or define a leading region 84 and/or a trailing region 86. Leading region 84, when present, may be configured to lead, or to be in front of, trailing region 86 as the circular saw is utilized to cut the workpiece. Stated another way, leading region 84 may lead trailing region 86 as the circular saw is operatively translated, relative to the workpiece, to form and/or define a corresponding cut in and/or within the workpiece. In some examples, such as when circular saws 10 include and/or are plunge saws 30, pivot assembly 316 may be positioned within and/or relatively proximate trailing region 86. In some examples, such as when circular saws 10 include handheld circular saws 12 that do not include plunge saws 30, pivot assembly 316 may be positioned within and/or relatively proximate leading region 84.

In examples of circular saws 10 that include and/or are plunge saws 30, circular saws 10 also may include a plunge biasing mechanism 56. Plunge biasing mechanism 56, when present, may be configured to urge relative rotation between cutting assembly 20 and base plate 304 toward retracted orientation 54. Examples of plunge biasing mechanism 56 include any suitable resilient member, spring, and/or compression spring.

In some examples, and as discussed, circular saws 10 may include and/or be track saw 40. In examples of circular saws 10 that are or include a track saw 40, base plate 304 may include a rib-receiving channel 324, which may be configured to receive a raised elongate rib 44 of a track 42, as perhaps best illustrated in FIG. 3. Track 42 also may be referred to herein as an elongate track 42 and may be formed from one or more elongate track segments, or track sections, 46, which may be operatively attached to one another to define any suitable track length. During operation of track saws 40, track 42 may be operatively attached, or clamped, to workpiece 98 such that an edge of the track corresponds to a desired cut line for the track saw. Subsequently, the track saw may be positioned, relative to the track, such that raised elongate rib 44 is positioned within rib-receiving channel 324, and the track saw then may be translated along at least a fraction of the length of the elongate track, thereby producing a straight cut along the desired cut line.

Pivot assembly 316 may include any suitable structure that may operatively and/or rotationally attach cutting assembly 20 to base plate 304, that may be adapted, configured, designed, and/or constructed to permit and/or to facilitate relative rotation between the cutting assembly and the base plate about pivot axis 318, and/or that may be utilized to selectively vary region 320 that extends on assembly-opposed side 312 of the base plate. As an example, and as illustrated in FIGS. 1-2 and 4-7, pivot assembly 316 may include an elongate pivot rod 326. Elongate pivot rod 326 may include and/or be an at least partially cylindrical elongate pivot rod and/or may define a rod longitudinal axis 328. Rod longitudinal axis 328 may define pivot axis 318, may be parallel, or at least substantially parallel, to the pivot axis, may be collinear with the pivot axis, may be parallel, or at least substantially parallel, to arbor rotational axis 106 of arbor 100, and/or may be perpendicular, or at least substantially perpendicular, to blade rotation plane 202 within which circular saw blade 200 is configured to rotate.

As another example, pivot assembly 316 may include at least one pivot bearing 332. Pivot bearing 332, when present, may be configured to rotate about pivot axis 318, such as via rotation about, about an external surface of, and/or about a cylindrical surface of, elongate pivot rod 326. Examples of pivot bearing 332 include at least one roller bearing, at least one ball bearing, at least one bushing, and/or at least one low-friction rotary interface with elongate pivot rod 326.

In examples of pivot assemblies 316 that include both elongate pivot rod 326 and pivot bearing 332, one of cutting assembly 20 and base plate 304 may be directly attached to the elongate pivot rod and the other of the cutting assembly and the base plate may be indirectly attached to the pivot rod via the pivot bearing. Stated another way, the one of the cutting assembly and the base plate may rotate with elongate pivot rod 326 during operative rotation of cutting assembly 20 and base plate 304 relative to one another about pivot axis 318. Additionally or alternatively, the other of the cutting assembly and the base plate may rotate with pivot bearing 332 during operative rotation of cutting assembly 20 and base plate 304 relative to one another about pivot axis 318.

In examples of circular saws 10 where pivot assembly 316 includes elongate pivot rod 326, the elongate pivot rod 326 may be referred to herein as extending between two opposed rod ends 330, such as a first rod end and a second rod end, as perhaps best illustrated in FIG. 4. In some such examples, pivot bias mechanism 340 also may be referred to herein as urging cutting assembly 20 toward one of the opposed rod ends 330, such as the first rod end, and also urging base plate 304 toward the other of the opposed rod ends 330, such as the second rod end.

Pivot bias mechanism 340 may include any suitable structure that may be adapted, configured, designed, and/or constructed to apply linear bias force 342 between cutting assembly 20 and base plate 304 in the linear bias direction and/or to urge the cutting assembly and the base plate in opposed, or in opposite, directions along pivot axis 318. Examples of pivot bias mechanism 340 include a structure that is in tension, or only in tension, within the circular saw, a tension spring, a structure that is in compression, or only in compression, within the circular saw, a compression spring, and/or a resilient member.

In some examples, pivot bias mechanism 340 may be operatively attached, or directly attached, to both cutting assembly 20 and base plate 304. As an example, cutting assembly 20 may include and/or define a cutting assembly bias mechanism mount 22, and base plate 304 may include and/or define a base plate bias mechanism mount 306. In such examples, pivot bias mechanism 340 may be operatively attached to cutting assembly bias mechanism mount 22 and also to base plate bias mechanism mount 306. Additionally or alternatively, pivot bias mechanism 340 may apply linear bias force 342 between cutting assembly bias mechanism mount 22 and base plate bias mechanism mount 306.

It is within the scope of the present disclosure that pivot bias mechanism 340, cutting assembly bias mechanism mount 22, and/or base plate bias mechanism mount 306 may be separate, distinct, and/or spaced apart from pivot assembly 316 and/or from plunge biasing mechanism 56. Such a configuration may permit and/or facilitate improved, or simplified, installation of the pivot bias mechanism within the circular saw, such as subsequent to assembly of pivot assembly 316. Such a configuration additionally or alternatively may decrease a friction within pivot assembly 316 caused by pivot bias mechanism 340 and/or caused by application of linear bias force 342.

In some examples, pivot bias mechanism 340 may be configured to pivot, or to rotate, relative to cutting assembly bias mechanism mount 22 as the cutting assembly and the base plate operatively rotate relative to one another and about pivot axis 318. Additionally or alternatively, pivot bias mechanism 340 may be configured to pivot, or to rotate, relative to base plate bias mechanism mount 306 as the cutting assembly and the base plate operatively rotate relative to one another and about pivot axis 318. Such a configuration may permit and/or facilitate application of linear bias force 342, or only a linear bias force 342, regardless of a rotational relative orientation between the cutting assembly and the base plate about the pivot axis.

During operative rotation of cutting assembly 20 and base plate 304, relative to one another and/or about pivot axis 318, cutting assembly bias mechanism mount 22 and base plate bias mechanism mount 306 may move relative to one another. With this in mind, an overall distance between the base plate bias mechanism mount and the cutting assembly bias mechanism mount may vary during this operative rotation and/or as a relative angle between the cutting assembly and the base plate is varied. Such a configuration may permit and/or facilitate variation in a magnitude of linear bias force 342, such as to increase the linear bias force for relative rotations between the cutting assembly and the base plate that have a higher potential for undesirable relative motion between the cutting assembly and the base plate.

Base plate bias mechanism mount 306 and cutting assembly bias mechanism mount 22 both may be configured to operatively rotate about pivot assembly 316 and/or pivot axis 318 thereof within a rotation plane that may be perpendicular, or at least substantially perpendicular, to pivot axis 318. With this in mind, a pivot axis distance between base plate bias mechanism mount 306 and cutting assembly bias mechanism mount 22, as measured along pivot axis 318, may be constant, or at least substantially constant, as the cutting assembly and the base plate rotate relative to one another and/or about the pivot axis.

The linear bias direction of linear bias force 342 may extend along, or at least partially along, pivot axis 318. Stated another way, a vector that defines a direction of linear bias force 342 may have a component that extends parallel to pivot axis 318. Such a configuration may permit and/or facilitate urging of the cutting assembly and the base plate in opposed directions along the pivot axis, as discussed herein.

However, circular saws 10, pivot assemblies 316, and/or pivot bias mechanisms 340 may be configured such that a relative orientation between the linear bias direction of linear bias force 342 and pivot axis 318 varies as the cutting assembly and the base plate rotate relative to one another and about the pivot axis. Additionally or alternatively, and for at least some relative rotations between the cutting assembly and the base plate, the linear bias direction may be skew to the pivot axis. Such a configuration may permit linear bias force 342 to supplement plunge biasing mechanism 56, when present, thereby further urging cutting assembly 20 and base plate 304 toward retracted orientation 54, as discussed herein.

In some examples, and as illustrated in dashed lines in FIGS. 1-2 and 4, circular saws 10 may include a rotation lock 360. Rotation lock 360, when present, may be adapted, configured, designed, and/or constructed to define a locked configuration and an unlocked configuration. When in the locked configuration, rotation lock 360 may, or may be configured to, resist, block, or stop relative rotation of cutting assembly 20 and base plate 304 about pivot axis 318. However, when in the unlocked configuration, rotation lock 360 may permit the relative rotation between the cutting assembly and the base plate about the pivot axis.

In examples of circular saws 10 that are or include plunge saws 30, rotation lock 360 may include and/or be a plunge lock 362. Plunge lock 362, when present, may be adapted, configured, designed, and/or constructed to be actuated, by the user of the circular saw and/or during operative use of the circular saw to cut the workpiece, to selectively permit the user to increase depth-of-cut 224 of the circular saw. In some such examples, and as perhaps best illustrated in FIGS. 9-14 and 16, plunge lock 362 may be positioned to be actuated by the user while the user grips the circular saw via gripping region 60 and/or with a digit of a hand that grips the gripping region. Such a configuration may permit the user to selectively actuate the plunge lock, thereby to selectively permit the circular saw blade to be plunged into the workpiece via rotation of cutting assembly 20 and base plate 304 relative to one another and about pivot axis 318.

In some conditions, plunge lock 362 may be biased to resist, or to automatically resist, rotation of cutting assembly 20 relative to base plate 304 and/or about pivot axis 318, such as when the plunge saw is in retracted orientation 54. Additionally or alternatively, plunge lock 362 may be configured to permit, or to automatically permit, rotation of the cutting assembly relative to the base plate and/or about the pivot axis when the relative rotation differs from the retracted orientation. Stated another way, plunge lock 362 may be configured to lock the plunge saw in retracted orientation 54, and actuation of the plunge lock may permit the plunge saw to transition toward and/or to plunged orientation 52.

Rotation lock 360 may include any suitable structure that is configured to be selectively transitioned between the locked configuration and the unlocked configuration. Examples of rotation lock 360 include a set screw, a selectively actuated friction interface, a selectively actuated latch, and/or a selectively actuated catch.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of circular saws according to the present disclosure are presented in the following enumerated paragraphs.

A1. A circular saw, comprising:
a cutting assembly including:
(i) a motor including a motor shaft configured to rotate about a shaft rotational axis; and
(ii) an arbor configured to operatively attach a circular saw blade to the circular saw and to rotate the circular saw blade about an arbor rotational axis when the arbor receives a torque from the motor via rotation of the motor shaft about the shaft rotational axis;
a base plate that defines an assembly-facing side and an assembly-opposed side;
a pivot assembly that operatively attaches the cutting assembly to the base plate such that the assembly-facing side of the base plate faces toward the cutting assembly, wherein the cutting assembly and the base plate are configured to operatively rotate, relative to one another and about a pivot axis of the pivot assembly, to selectively vary a region of the circular saw blade that extends on the assembly-opposed side of the base plate; and
a pivot bias mechanism configured to apply a linear bias force between the cutting assembly and the base plate in a linear bias direction that urges the cutting assembly and the base plate in opposed directions along the pivot axis.

A2. The circular saw of paragraph A1, wherein the pivot assembly includes an elongate pivot rod.

A3. The circular saw of paragraph A2, wherein the elongate pivot rod is an at least partially cylindrical elongate pivot rod.

A4. The circular saw of any of paragraphs A2-A3, wherein the elongate pivot rod defines a rod longitudinal axis that at least one of:
(i) is parallel, or at least substantially parallel, to the pivot axis;
(ii) is collinear with the pivot axis;
(iii) is parallel, or at least substantially parallel, to the arbor rotational axis; and
(iv) is perpendicular, or at least substantially perpendicular, to a blade rotation plane within which the circular saw blade is configured to rotate.

A5. The circular saw of any of paragraphs A2-A4, wherein the pivot assembly further includes a pivot bearing configured to rotate about the pivot axis via rotation about the elongate pivot rod.

A6. The circular saw of paragraph A5, wherein the pivot bearing includes at least one of:
(i) at least one roller bearing;
(ii) at least one ball bearing;
(iii) at least one bushing; and
(iv) at least one low-friction interface with the elongate pivot rod.

A7. The circular saw of any of paragraphs A5-A6, wherein:
(i) one of the cutting assembly and the base plate is directly attached to the elongate pivot rod;
(ii) the other of the cutting assembly and the base plate is indirectly attached to the pivot rod via the pivot bearing.

A8. The circular saw of any of paragraphs A1-A7, wherein the pivot axis at least one of:
(i) is parallel, or at least substantially parallel, to the arbor rotational axis; and
(ii) is perpendicular, or at least substantially perpendicular, to a/the blade rotation plane within which the circular saw blade is configured to rotate.

A9. The circular saw of any of paragraphs A2-A8, wherein the elongate pivot rod extends between a first rod end and a second rod end, and further wherein the linear bias force urges the cutting assembly toward the first rod end and also urges the base plate toward the second rod end.

A10. The circular saw of any of paragraphs A1-A9, wherein the pivot bias mechanism at least one of:
(i) is in tension, or only in tension, within the circular saw;
(ii) includes a tension spring;
(iii) is in compression, or only in compression, within the circular saw;
(iv) includes a compression spring; and
(v) includes a resilient member.

A11. The circular saw of any of paragraphs A1-A10, wherein the pivot bias mechanism is directly attached to both the cutting assembly and the base plate.

A12. The circular saw of any of paragraphs A1-A11, wherein the cutting assembly includes a cutting assembly bias mechanism mount, and further wherein the base plate includes a base plate bias mechanism mount.

A13. The circular saw of paragraph A12, wherein at least one of:
(i) the pivot bias mechanism is operatively attached to the cutting assembly bias mechanism mount and to the base plate bias mechanism mount; and
(ii) the pivot bias mechanism applies the linear bias force between the cutting assembly bias mechanism mount and the base plate bias mechanism mount.

A14. The circular saw of any of paragraphs A12-A13, wherein at least one of:
(i) the cutting assembly bias mechanism mount is spaced apart from the pivot assembly; and
(ii) the base plate bias mechanism mount is spaced apart from the pivot assembly.

A15. The circular saw of any of paragraphs A12-A14, wherein at least one of:
(i) the pivot bias mechanism is configured to pivot relative to the cutting assembly bias mechanism mount as the cutting assembly and the base plate operatively rotate relative to one another and about the pivot axis; and
(ii) the pivot bias mechanism is configured to pivot relative to the base plate bias mechanism mount as the cutting assembly and the base plate operatively rotate relative to one another and about the pivot axis.

A16. The circular saw of any of paragraphs A12-A15, wherein an overall distance between the base plate bias mechanism mount and the cutting assembly bias mechanism mount varies as the cutting assembly and the base plate operatively rotate relative to one another about the pivot axis.

A17. The circular saw of any of paragraphs A12-A16, wherein a pivot axis distance between the base plate bias mechanism mount and the cutting assembly bias mechanism mount, as measured along the pivot axis, is constant, or at least substantially constant, as the cutting assembly and the base plate rotate relative to one another about the pivot axis.

A18. The circular saw of any of paragraphs A1-A17, wherein the pivot bias mechanism is configured such that a relative orientation between the linear bias direction and the pivot axis varies as the cutting assembly and the base plate rotate relative to one another and about the pivot axis.

A19. The circular saw of any of paragraphs A1-A18, wherein for at least some relative rotations between the cutting assembly and the base plate, the linear bias direction is skew to the pivot axis.

A20. The circular saw of any of paragraphs A1-A19, wherein the linear bias direction extends at least partially along the pivot axis.

A21. The circular saw of any of paragraphs A1-A20, wherein the circular saw further includes a rotation lock that defines a locked configuration, in which the rotation lock resists relative rotation of the cutting assembly and the base plate about the pivot axis, and an unlocked configuration, in which the rotation lock permits relative rotation between the cutting assembly and the base plate about the pivot axis.

A22. The circular saw of paragraph A21, wherein the rotation lock includes at least one of:
(i) a set screw;
(ii) a selectively actuated friction interface;
(iii) a selectively actuated latch; and
(iv) a selectively actuated catch.

A23. The circular saw of any of paragraphs A1-A22, wherein the base plate at least one of:
(i) is a monolithic, or unitary, base plate; and
(ii) is a base plate assembly that includes a plurality of distinct base plate components.

A24. The circular saw of any of paragraphs A1-A23, wherein the motor includes an electric motor.

A25. The circular saw of any of paragraphs A1-A24, wherein the circular saw further includes a gripping region configured to be gripped by a user of the circular saw during operation of the circular saw to cut a workpiece.

A26. The circular saw of any of paragraphs A1-A25, wherein the circular saw further includes a switch configured to selectively apply an electric current to at least one other component of the circular saw.

A27. The circular saw of paragraph A26, wherein the switch is positioned to be actuated, by a/the user of the circular saw, while the user grips a/the gripping region of the circular saw.

A28. The circular saw of any of paragraphs A1-A27, wherein the circular saw further includes a blade guard configured to prevent contact between a/the user and the saw blade.

A29. The circular saw of paragraph A28, wherein the blade guard includes a retractable region configured to retract when the circular saw is utilized to cut a/the workpiece.

A30. The circular saw of any of paragraphs A1-A29, wherein the circular saw further includes at least one of:
(i) a power cord configured to provide electric current to the circular saw; and
(ii) a battery configured to provide electric current to the circular saw.

A31. The circular saw of any of paragraphs A1-A30, wherein the circular saw includes the circular saw blade that is operatively attached to the circular saw via the arbor for rotational movement with the arbor.

A32. The circular saw of any of paragraphs A1-A31, wherein the circular saw is at least one of:
(i) a miter saw;
(ii) a chop saw; and
(iii) a bevel saw.

A33. The circular saw of any of paragraphs A1-A31, wherein the circular saw is a plunge saw.

A34. The circular saw of any of paragraphs A1-A33, wherein the circular saw defines a leading region and a trailing region, wherein the leading region is configured to lead the trailing region as the circular saw is utilized to cut a/the workpiece, and further wherein the pivot assembly is positioned within the trailing region.

A35. The circular saw of any of paragraphs A1-A34, wherein the circular saw includes a plunge lock configured to be actuated, by a/the user of the circular saw and during operative use of the circular saw to cut a/the workpiece, to selectively permit the user to increase a depth-of-cut of the circular saw to plunge the circular saw into the workpiece.

A36. The circular saw of paragraph A35, wherein the plunge lock is positioned to be actuated, by the user, at least one of:
(i) while the user grips a/the gripping region of the circular saw; and
(ii) with a digit of a hand of the user that grips the gripping region of the circular saw.

A37. The circular saw of any of paragraphs A35-A36, wherein the plunge lock is biased to automatically resist rotation of the cutting assembly, relative to the base plate and about the pivot axis, when relative rotation between the cutting assembly and the base plate defines a retracted orientation.

A38. The circular saw of any of paragraphs A35-A37, wherein the plunge lock is configured to automatically permit rotation of the cutting assembly, relative to the base plate and about the pivot axis, when relative rotation between the cutting assembly and the base plate differs from a/the retracted orientation.

A39. The circular saw of any of paragraphs A1-A31 and A33-A38, wherein the circular saw includes a plunge biasing mechanism that urges relative rotation between the cutting assembly and the base plate toward a/the retracted orientation.

A40. The circular saw of any of paragraphs A1-A31 and A33-A39, wherein the circular saw is a track saw.

A41. The circular saw of paragraph A40, wherein the base plate further includes a rib-receiving channel configured to receive a raised elongate rib of a track.

A42. The circular saw of any of paragraphs A40-A41, wherein the track saw further includes a/the track, and wherein the track includes a/the raised elongate rib.

A43. The circular saw of any of paragraphs A1-A31, wherein the circular saw is a handheld circular saw.

A44. The circular saw of paragraph A43, wherein the circular saw defines a leading region and a trailing region, wherein the leading region is configured to lead the trailing region as the circular saw is utilized to cut a/the workpiece, and further wherein the pivot assembly is positioned within the leading region.

INDUSTRIAL APPLICABILITY

The circular saws disclosed herein are applicable to the power tool industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements, and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A circular saw, comprising:
   a cutting assembly including:
   (i) a motor including a motor shaft configured to rotate about a shaft rotational axis; and
   (ii) an arbor configured to operatively attach a circular saw blade to the motor shaft and to rotate the circular saw blade about an arbor rotational axis when the arbor receives a torque from the motor via rotation of the motor shaft about the shaft rotational axis;
   a base plate that defines an assembly-facing side and an assembly-opposed side;
   a pivot assembly that operatively attaches the cutting assembly to the base plate such that the assembly-facing side of the base plate faces toward the cutting assembly, wherein the cutting assembly and the base plate are configured to operatively rotate, relative to one another and about a pivot axis of the pivot assembly, to selectively vary a region of the circular saw blade that extends on the assembly-opposed side of the base plate; and
   a pivot bias mechanism configured to apply a linear bias force between the cutting assembly and the base plate in a linear bias direction that urges the cutting assembly and the base plate in opposed directions, the opposed directions extending along the pivot axis;
   wherein the cutting assembly includes a cutting assembly bias mechanism mount, wherein the base plate includes a base plate bias mechanism mount, and further wherein at least one of:
   (i) the cutting assembly bias mechanism mount is spaced apart from the pivot assembly; and
   (ii) the base plate bias mechanism mount is spaced apart from the pivot assembly.

2. The circular saw of claim 1, wherein the pivot assembly includes an elongate pivot rod.

3. The circular saw of claim 2, wherein the elongate pivot rod defines a rod longitudinal axis that at least one of:
   (i) is parallel to the pivot axis;
   (ii) is collinear with the pivot axis;
   (iii) is parallel to the arbor rotational axis; and
   (iv) is perpendicular to a blade rotation plane within which the circular saw blade is configured to rotate.

4. The circular saw of claim 2, wherein the pivot assembly further includes a pivot bearing configured to rotate about the pivot axis via rotation about the elongate pivot rod.

5. The circular saw of claim 4, wherein:
   (i) one of the cutting assembly and the base plate is directly attached to the elongate pivot rod;
   (ii) the other of the cutting assembly and the base plate is indirectly attached to the elongate pivot rod via the pivot bearing.

6. The circular saw of claim 1, wherein the pivot axis is parallel to the arbor rotational axis.

7. The circular saw of claim 1, wherein the pivot bias mechanism at least one of:
   (i) is in tension within the circular saw;
   (ii) includes a tension spring;
   (iii) is in compression within the circular saw;
   (iv) includes a compression spring; and
   (v) includes a resilient member.

8. The circular saw of claim 1, wherein at least one of:
   (i) the pivot bias mechanism is operatively attached to the cutting assembly bias mechanism mount and to the base plate bias mechanism mount; and
   (ii) the pivot bias mechanism applies the linear bias force between the cutting assembly bias mechanism mount and the base plate bias mechanism mount.

9. The circular saw of claim 8, wherein at least one of:
   (i) the pivot bias mechanism is configured to pivot relative to the cutting assembly bias mechanism mount as the cutting assembly and the base plate operatively rotate relative to one another and about the pivot axis; and
   (ii) the pivot bias mechanism is configured to pivot relative to the base plate bias mechanism mount as the cutting assembly and the base plate operatively rotate relative to one another and about the pivot axis.

10. The circular saw of claim 8, wherein an overall distance between the base plate bias mechanism mount and the cutting assembly bias mechanism mount varies as the cutting assembly and the base plate operatively rotate relative to one another about the pivot axis.

11. The circular saw of claim 8, wherein a pivot axis distance between the base plate bias mechanism mount and the cutting assembly bias mechanism mount, as measured along the pivot axis, is constant as the cutting assembly and the base plate rotate relative to one another about the pivot axis.

12. The circular saw of claim 1, wherein the pivot bias mechanism is configured such that a relative orientation between the linear bias direction and the pivot axis varies as the cutting assembly and the base plate rotate relative to one another and about the pivot axis.

13. The circular saw of claim 1, wherein the linear bias direction extends at least partially along the pivot axis.

14. The circular saw of claim 1, wherein the circular saw further includes a rotation lock that defines a locked configuration, in which the rotation lock resists relative rotation of the cutting assembly and the base plate about the pivot axis, and an unlocked configuration, in which the rotation lock permits relative rotation between the cutting assembly and the base plate about the pivot axis.

15. The circular saw of claim 1, wherein the circular saw is at least one of:
   (i) a miter saw;
   (ii) a chop saw; and
   (iii) a bevel saw.

16. The circular saw of claim 1, wherein the circular saw is a plunge saw, wherein the circular saw defines a leading region and a trailing region, wherein the leading region is configured to lead the trailing region as the circular saw is utilized to cut a workpiece, and further wherein the pivot assembly is positioned within the trailing region.

17. The circular saw of claim 16, wherein the circular saw includes a plunge lock configured to be actuated, by a user of the circular saw and during operative use of the circular saw to cut the workpiece, to selectively permit the user to increase a depth-of-cut of the circular saw to plunge the circular saw into the workpiece.

18. The circular saw of claim 16, wherein the circular saw includes a plunge biasing mechanism that urges relative rotation between the cutting assembly and the base plate toward a retracted orientation.

19. The circular saw of claim 1, wherein the circular saw is a handheld circular saw, wherein the circular saw defines a leading region and a trailing region, wherein the leading region is configured to lead the trailing region as the circular saw is utilized to cut a workpiece, and further wherein the pivot assembly is positioned within the leading region.

* * * * *